(12) United States Patent
Oosawa

(10) Patent No.: US 11,183,334 B2
(45) Date of Patent: Nov. 23, 2021

(54) MULTILAYER CERAMIC ELECTRONIC COMPONENT

(71) Applicant: Murata Manufacturing Co., Ltd., Nagaokakyo (JP)

(72) Inventor: Wataru Oosawa, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 7 days.

(21) Appl. No.: 16/897,324

(22) Filed: Jun. 10, 2020

(65) Prior Publication Data

US 2020/0402718 A1    Dec. 24, 2020

(30) Foreign Application Priority Data

Jun. 24, 2019 (JP) .............................. JP2019-116044

(51) Int. Cl.
| | | |
|---|---|---|
| *H01G 4/30* | (2006.01) | |
| *H01G 4/012* | (2006.01) | |
| *H01G 4/008* | (2006.01) | |
| *H01G 4/232* | (2006.01) | |
| *H01G 4/248* | (2006.01) | |
| *H01G 4/12* | (2006.01) | |

(52) U.S. Cl.
CPC ............... *H01G 4/30* (2013.01); *H01G 4/008* (2013.01); *H01G 4/012* (2013.01); *H01G 4/2325* (2013.01); *H01G 4/248* (2013.01); *H01G 4/1227* (2013.01)

(58) Field of Classification Search
CPC ........ H01G 4/012; H01G 4/1227; H01G 4/33; H01G 4/248; H01G 4/224; H01G 4/2325; H01G 4/30; H01G 4/14; H01G 4/008; H01G 4/1236; H01G 4/1245
See application file for complete search history.

(56) References Cited

U.S. PATENT DOCUMENTS

| | | | | |
|---|---|---|---|---|
| 2014/0301013 | A1* | 10/2014 | Kim ......................... | H01G 4/01 361/301.4 |
| 2015/0348712 | A1* | 12/2015 | Lee ......................... | H01G 4/248 174/260 |
| 2019/0035554 | A1* | 1/2019 | Inomata ................... | H01G 4/12 |
| 2019/0362897 | A1* | 11/2019 | Kato ....................... | H01G 4/232 |

FOREIGN PATENT DOCUMENTS

| | | |
|---|---|---|
| JP | 05-129152 A | 5/1993 |
| JP | 09-246017 A | 9/1997 |
| JP | 10-004027 A | 1/1998 |
| JP | 2015-226053 A | 12/2015 |

* cited by examiner

*Primary Examiner* — Michael P McFadden
(74) *Attorney, Agent, or Firm* — Keating & Bennett, LLP

(57) ABSTRACT

A multilayer ceramic electronic component includes a multilayer body including an inner layer portion in which inner electrode layers face each other, first and second outer layer portions respectively on first and second main surface sides. At the first and second outer layer portions, a grain size in the dielectric layer located on the inner layer portion side and a grain size in the dielectric layer located along each of respective ridgeline portion sides on which respective ones of the first and second main surfaces cross both end surfaces is smaller than the grain size in the dielectric layer located on the respective first and second main surface sides.

20 Claims, 10 Drawing Sheets

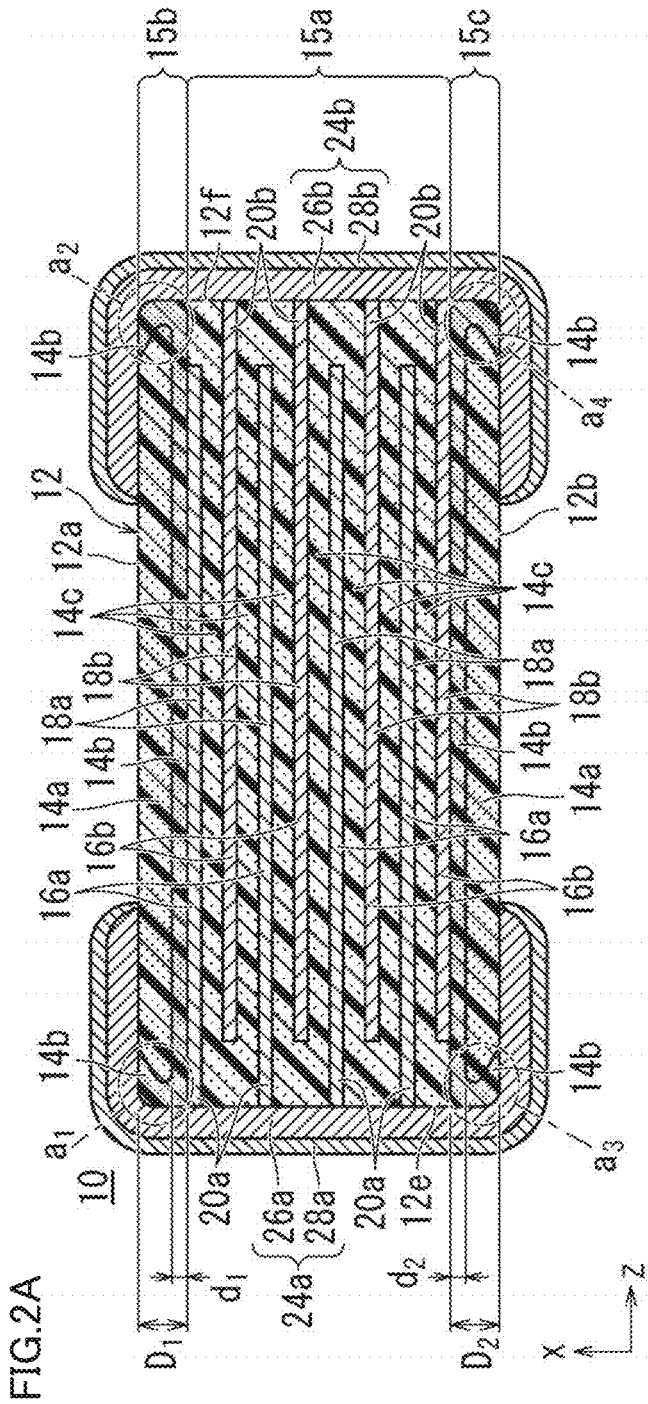
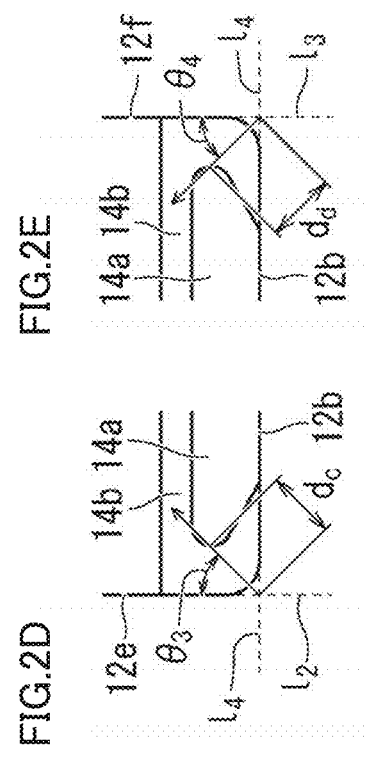
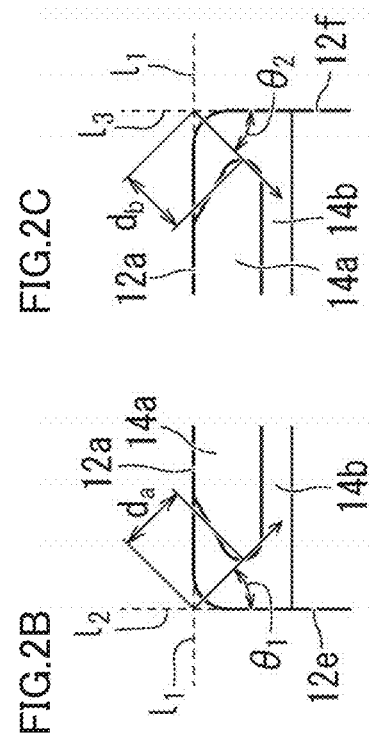

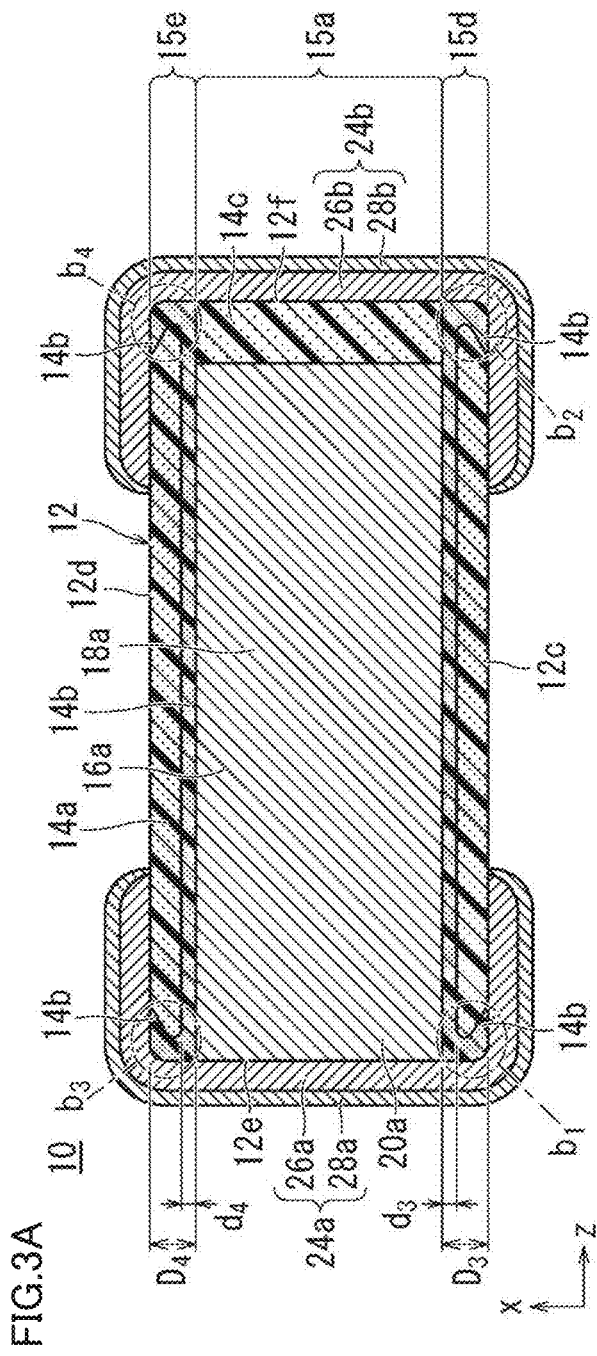
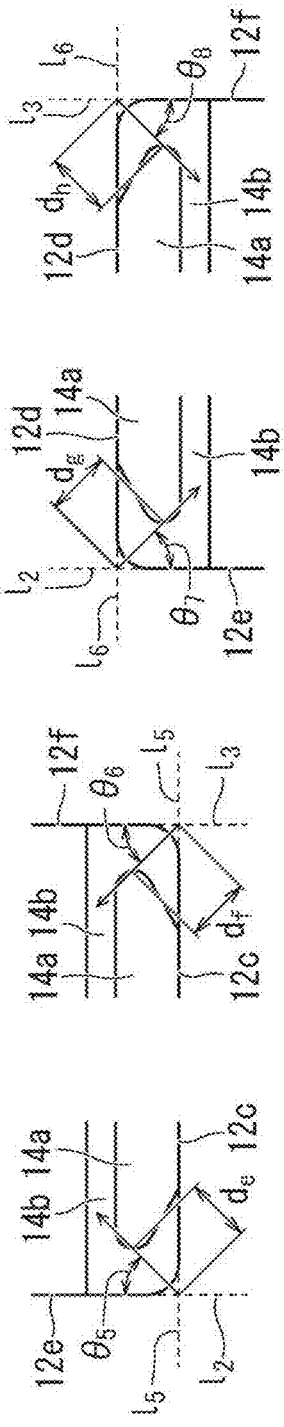
FIG.3A
FIG.3B FIG.3C FIG.3D FIG.3E

MULTILAYER CERAMIC ELECTRONIC COMPONENT

CROSS REFERENCE TO RELATED APPLICATIONS

This application claims the benefit of priority to Japanese Patent Application No. 2019-116044 filed on Jun. 24, 2019. The entire contents of this application are hereby incorporated herein by reference.

BACKGROUND OF THE INVENTION

1. Field of the Invention

The present disclosure relates to a multilayer ceramic electronic component.

2. Description of the Related Art

In recent years, since a multilayer ceramic electronic component such as a multilayer ceramic capacitor has attained a small size and a large capacitance, a ratio of an effective layer defined by an inner electrode has become large. Moreover, in view of such a background, the multilayer ceramic electronic component has begun to be used under an environment (for example, a high humidity environment) more severe than those for conventional ones. When the multilayer ceramic electronic component such as the multilayer ceramic capacitor is used under such an environment, there is a concern that moisture is likely to enter from an interface between an outer electrode and a ceramic element assembly, thus resulting in deterioration of reliability of moisture resistance. Moreover, since the ratio of the effective layer defined by the inner electrode becomes large, a thickness of an outer layer defined by a ceramic layer becomes thin. Accordingly, it is considered that when moisture such as plating liquid enters from the interface between the outer electrode and the ceramic element assembly during formation of a plated outer electrode, the moisture is more likely to reach an inner layer portion due to the thin thickness of the outer layer. As a result, there is a concern that the reliability of the moisture resistance of the multilayer ceramic electronic component is more likely to be deteriorated.

For example, Japanese Patent Laying-Open No. 2015-226053 discloses a multilayer ceramic capacitor, wherein a cover portion includes an active portion protective cover and an outer cover so as to cover an active portion including a dielectric layer and an inner electrode. Furthermore, Japanese Patent Laying-Open No. 2015-226053 describes that an average grain size of grains included in the outer cover is larger than an average grain size of grains included in the active portion protective cover.

With this structure, although not described as an effect of Japanese Patent Laying-Open No. 2015-226053, it can be considered that grain boundaries between the grains can be reduced by the average grain size of the grains included in the outer cover being larger than the average grain size of the grains included in the active portion protective cover, thereby obtaining an effect of improving adhesion force between the ceramic element assembly and the outer electrode. As a result, it is considered that moisture can be suppressed from entering from the interface between the outer electrode and the ceramic layer.

However, for example, a multilayer ceramic electronic component used for an electronic device or the like required in a market of in-vehicle devices or the like needs to have a larger capacitance, thus resulting in an increased size of the multilayer ceramic electronic component. The increased size of the multilayer ceramic electronic component leads to an increased weight of the multilayer ceramic electronic component, with the result that a greater impact is applied to a corner portion of the outer electrode during handling. Accordingly, an impact resistance at the corner portion of the multilayer ceramic electronic component becomes weak. Therefore, for example, when the multilayer ceramic electronic component having a structure such as that in Japanese Patent Laying-Open No. 2015-226053 is increased in size, it is considered that a crack may be generated in the corner portion of the multilayer ceramic electronic component due to an impact during a machining process or the like, even though the adhesion force between the ceramic element assembly and the outer electrode can be improved to suppress entry of moisture from the interface between the outer electrode and the ceramic layer.

SUMMARY OF THE INVENTION

Preferred embodiments of the present invention provide multilayer ceramic electronic components that are each able to ensure reliability in moisture resistance of multilayer ceramic electronic components against entry of moisture or the like, while providing crack resistance in the multilayer ceramic electronic component.

A multilayer ceramic electronic component according to a preferred embodiment of the present invention includes a multilayer body including a plurality of laminated dielectric layers and a plurality of inner electrode layers laminated on the dielectric layers, the multilayer body including a first main surface and a second main surface opposite to each other in a lamination direction, the multilayer body including a first end surface and a second end surface opposite to each other in a length direction orthogonal or substantially orthogonal to the lamination direction, the multilayer body including a first side surface and a second side surface opposite to each other in a width direction orthogonal to or substantially orthogonal to the lamination direction and the length direction; a first outer electrode disposed on the first end surface; and a second outer electrode disposed on the second end surface. The multilayer body includes an inner layer portion in which the plurality of inner electrode layers face each other; a first outer layer portion located on the first main surface side, the first outer layer portion including the plurality of dielectric layers located between the first main surface and each of a first outermost surface of the inner layer portion on the first main surface side and an extension line of the first outermost surface; a second outer layer portion located on the second main surface side, the second outer layer portion including the plurality of dielectric layers located between the second main surface and each of a second outermost surface of the inner layer portion on the second main surface side and an extension line of the second outermost surface; a third outer layer portion located on the first side surface side, the third outer layer portion including the plurality of dielectric layers located between the first side surface and a third outermost surface of the inner layer portion on the first side surface side; and a fourth outer layer portion located on the second side surface side, the fourth outer layer portion including the plurality of dielectric layers located between the second side surface and a fourth outermost surface of the inner layer portion on the second side surface side. In the first outer layer portion, a grain size in the dielectric layer located on the inner layer portion side is smaller than a grain size in the dielectric layer located on the first main surface side, and a grain size in the dielectric layer located along each of respective ridgeline portion sides on which the first main surface of the multilayer body crosses the first end surface and the second end surface is smaller than the grain size in the dielectric layer located on the first main surface side. In the second outer layer portion, a grain size in the dielectric layer located on the inner layer portion side is smaller than a grain size in the dielectric layer located on the second main surface side, and a grain size in the dielectric layer located along each of respective ridgeline portion sides on which the second main surface of the multilayer body crosses the first end surface and the second end surface is smaller than the grain size in the dielectric layer located on the second main surface side.

In a multilayer ceramic electronic component according to a preferred embodiment of the present invention, at the first outer layer portion, the grain sizes in the dielectric layer located on the inner layer portion side are smaller than the grain sizes in the dielectric layer located on the first main surface side, thus increasing grain boundaries in the dielectric layer located on the inner layer portion side. Generally, a dislocation responsible for plastic deformation cannot move to pass over a grain boundary. Thus, each of the grain boundaries obstructs the dislocation, so as to reduce or prevent progress of cracks resulting from the plastic deformation. The small grain sizes and the increased number of grain boundaries lead to increased strength against progress of cracks. Thus, even if a crack is generated in the multilayer body, progress of the crack is able to be reduced or prevented.

In other words, in a multilayer ceramic electronic component according to a preferred embodiment of the present invention, at the first outer layer portion, the grain sizes in the dielectric layer located on the first main surface side are larger than the grain sizes in the dielectric layer located on the inner layer portion side. Thus, the grain boundaries between the grains are able to be reduced so as to improve adhesion force between the multilayer body and the outer electrode. As a result, moisture is able to be reduced or prevented from entering from an interface between the outer electrode and the multilayer body.

Further, in a multilayer ceramic electronic component according to a preferred embodiment of the present invention, at the first outer layer portion, the grain sizes in the dielectric layer located along each of respective the ridgeline portion sides on which the first main surface of the multilayer body crosses the first end surface and the second end surface are smaller than the grain sizes in the dielectric layer located on the first main surface side, thus increasing the grain boundaries in the dielectric layer located along the ridgeline portion side. Accordingly, a dislocation responsible for plastic deformation is also reduced or prevented at the ridgeline portion, thus resulting in increased strength against progress of cracks. Accordingly, even when the multilayer ceramic electronic component is a large-size multilayer ceramic electronic component that has a large weight and that receives a large impact on a corner portion, the strength is increased against the progress of the cracks in the dielectric layer located along the ridgeline portion side. Thus, an impact resistance at the corner portion of the multilayer ceramic electronic component is able to be improved.

According to preferred embodiments of the present invention, multilayer ceramic electronic components are provided that are each able to secure reliability in moisture resistance of multilayer ceramic electronic components against entry of moisture or the like while obtaining crack resistance in the multilayer ceramic electronic component.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2A is a cross sectional view taken along a line II-II of FIG. 1 and showing a multilayer ceramic capacitor according to a preferred embodiment of the present invention, and FIG. 2B to FIG. 2E are respective enlarged views of an a1 portion, an a2 portion, an a3 portion, and an a4 portion in FIG. 2A.

FIG. 3A is a cross sectional view taken along a line III-III of FIG. 1 and showing a multilayer ceramic capacitor according to a preferred embodiment of the present invention, and FIGS. 3B to 3E are respective enlarged views of a b1 portion, a b2 portion, a b3 portion, and a b4 portion in FIG. 3A.

FIG. 11A shows a state in which one multilayer ceramic capacitor is fixed and another multilayer ceramic capacitor is yet to be pressed there against, and FIG. 11B shows a state in which the another multilayer ceramic capacitor is pressed against the one multilayer ceramic capacitor.

DETAILED DESCRIPTION OF THE PREFERRED EMBODIMENTS

Figure 1:
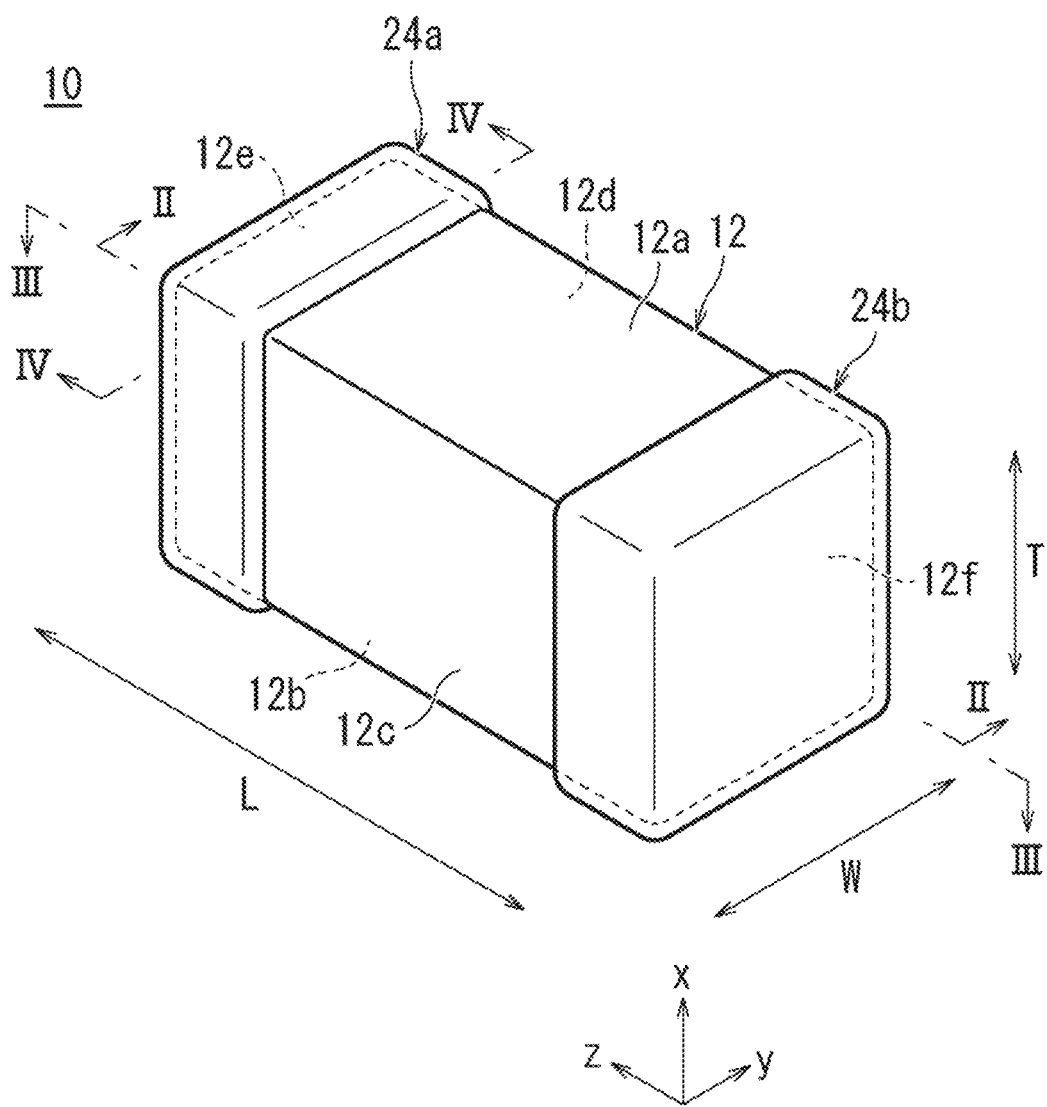
FIG. 1 is an external perspective view of a multilayer ceramic capacitor according to a preferred embodiment of the present invention.
Figure 4:
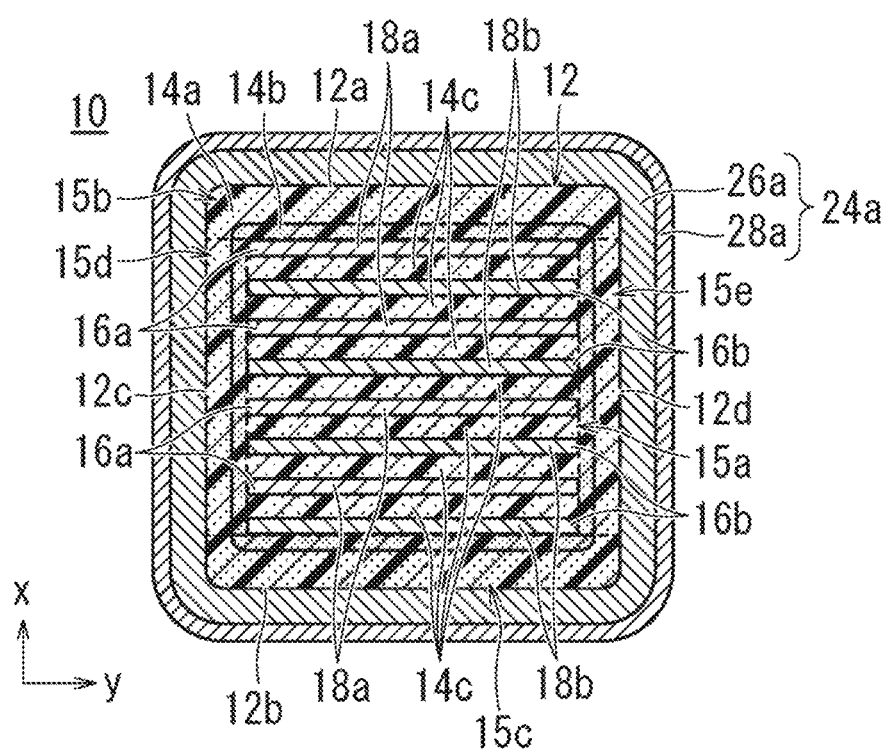
FIG. 4 is a cross sectional view taken along a line IV-IV of FIG. 1 and showing a multilayer ceramic capacitor according to a preferred embodiment of the present invention.

The following describes a multilayer ceramic capacitor 10 included in a multilayer ceramic electronic component according to a preferred embodiment of the present invention. FIG. 1 is an external perspective view showing an exemplary multilayer ceramic capacitor 10 according to a preferred embodiment of the present invention. FIG. 2A is a cross sectional view taken along a line II-II of FIG. 1 and showing multilayer ceramic capacitor 10, and FIG. 2B to FIG. 2E are respective enlarged views of an a1 portion, an a2 portion, an a3 portion, and an a4 portion in FIG. 2A. FIG. 3A is a cross sectional view taken along a line III-III of FIG. 1 and showing multilayer ceramic capacitor 10, and FIGS. 3B to 3E are respective enlarged views of a b1 portion, a b2 portion, a b3 portion, and a b4 portion in FIG. 3A. FIG. 4 is a cross sectional view taken along a line IV-IV of FIG. 1 and showing multilayer ceramic capacitor 10.

As shown in FIG. 1 to FIG. 4, multilayer ceramic capacitor 10 includes a multilayer body 12 having a rectangular or substantially rectangular parallelepiped shape, and outer electrodes 24 (24a, 24b) disposed at respective ends of multilayer body 12.

Multilayer Body

As shown in FIG. 1, in multilayer body 12, the x direction represents a lamination direction, the y direction represents a width direction, and the z direction represents a length direction. As shown in FIG. 2A to FIG. 4, multilayer body 12 includes a plurality of laminated dielectric layers 14 (14a, 14b, 14c); and a plurality of laminated inner electrode layers 16 (16a, 16b). Multilayer body 12 includes a first main surface 12a and a second main surface 12b facing each other in lamination direction x; a first side surface 12c and a second side surface 12d facing each other in width direction y; and a first end surface 12e and a second end surface 12f facing each other in length direction z.

Multilayer body 12 has a rectangular or substantially rectangular parallelepiped shape, and preferably has rounded corner portions and rounded ridgeline portions. Each of the corner portions is a portion at which three surfaces of multilayer body 12 cross, and each of the ridgeline portions is a portion at which two surfaces of multilayer body 12 cross. Moreover, irregularities or the like may be provided in a portion or in the entirety of the main surfaces (12a, 12b), the side surfaces (12c, 12d), and the end surfaces (12e, 12f).

As shown in FIG. 2A to FIG. 4, in multilayer body 12, the plurality of inner electrode layers 16 face each other in lamination direction x. Multilayer body 12 includes an inner layer portion 15a, a first main surface side outer layer portion 15b (first outer layer portion), a second main surface side outer layer portion 15c (second outer layer portion), a first side surface side outer layer portion 15d (third outer layer portion), and a second side surface side outer layer portion 15e (fourth outer layer portion). In inner layer portion 15a, dielectric layers 14 are provided between inner electrode layers 16. First main surface side outer layer portion 15b (first outer layer portion) is located on the first main surface 12a side, and is defined by the plurality of dielectric layers 14 located between first main surface 12a and each of an outermost surface (first outermost surface) of inner layer portion 15a on the first main surface 12a side and an extension line of the outermost surface. Second main surface side outer layer portion 15c (second outer layer portion) is located on the second main surface 12b side, and is defined by the plurality of dielectric layers 14 located between second main surface 12b and each of an outermost surface (second outermost surface) of inner layer portion 15a on the second main surface 12b side and an extension line of the outermost surface. First side surface side outer layer portion 15d (third outer layer portion) is located on the first side surface 12c side, and is defined by the plurality of dielectric layers 14 located between first side surface 12c and each of an outermost surface (third outermost surface) of inner layer portion 15a on the first side surface 12c side and an extension line of the outermost surface. Second side surface side outer layer portion 15e (fourth outer layer portion) is located on the second side surface 12d side, and is defined by the plurality of dielectric layers 14 located between second side surface 12d and each of an outermost surface (fourth outermost surface) of inner layer portion 15a on the second side surface 12d side and an extension line of the outermost surface.

As shown in FIG. 2A to FIG. 4, multilayer body 12 includes first main surface side outer layer portion 15b that is located on the first main surface 12a side and that is defined by the plurality of dielectric layers 14 located between first main surface 12a and each of the outermost surface of inner layer portion 15a on the first main surface 12a side and the extension line of the outermost surface.

As shown in FIG. 2A and FIG. 4, first main surface side outer layer portion 15b is defined by a first dielectric region 14a and a second dielectric region 14b in which grain sizes are smaller than those in first dielectric region 14a.

As shown in FIGS. 2A to 2C, at first main surface side outer layer portion 15b, first dielectric region 14a includes an LT surface having a trapezoidal or substantially trapezoidal shape, and is located on the first main surface 12a side of first main surface side outer layer portion 15b. Second dielectric region 14b includes an LT surface having a substantially fishhook shape, and is located on the inner layer portion 15a side of first main surface side outer layer portion 15b and each of the respective ridgeline portion sides on which first main surface 12a at first main surface side outer layer portion 15b crosses first end surface 12e and second end surface 12f. Therefore, the number of grain boundaries on the inner layer portion 15a side of first main surface side outer layer portion 15b on which second dielectric region 14b is located and each of the respective ridgeline portion sides on which first main surface 12a at first main surface side outer layer portion 15b crosses first end surface 12e and second end surface 12f are larger than the number of grain boundaries on the first main surface 12a side of first main surface side outer layer portion 15b on which first dielectric region 14a is located. Generally, a dislocation responsible for plastic deformation cannot move to pass over a grain boundary. Thus, each of the grain boundaries obstructs the dislocation, so as to reduce or prevent progress of cracks resulting from the plastic deformation. The small grain sizes and the increased number of grain boundaries lead to increased strength against progress of cracks. Thus, even if a crack is generated in multilayer body 12, progress of the crack can be reduced or prevented.

In other words, according to the present preferred embodiment, at first main surface side outer layer portion 15b, the grain sizes in first dielectric region 14a are larger than the grain sizes in second dielectric region 14b. Accordingly, the grain boundaries between the grains can be reduced, such that it is considered that an advantageous effect of improving adhesion force between multilayer body 12 and outer electrode 24 can be obtained. As a result, moisture can be reduced or prevented from entering from an interface between outer electrode 24 and multilayer body 12.

Further, in the present preferred embodiment, second dielectric region 14b is located not only on the inner layer portion 15a side of first main surface side outer layer portion 15b but also on each of the respective ridgeline portion sides on which first main surface 12a at first main surface side outer layer portion 15b crosses first end surface 12e and second end surface 12f. Moreover, the number of grain boundaries in second dielectric region 14b is larger than the number of grain boundaries in first dielectric region 14a. Thus, a dislocation responsible for plastic deformation is also reduced or prevented at each of the respective ridgeline portions at which first main surface 12a at first main surface side outer layer portion 15b crosses first end surface 12e and second end surface 12f. Accordingly, strength against progress of cracks is increased.

Here, when multilayer ceramic capacitor 10 is large, the weight thereof is large, with the result that a large impact is applied to the ridgeline portion. Thus, an impact resistance of the ridgeline portion is decreased. However, in multilayer ceramic capacitor 10 according to the present preferred embodiment, since second dielectric region 14b is located on each of the respective ridgeline portion sides on which first main surface 12a at first main surface side outer layer portion 15b crosses first end surface 12e and second end surface 12f, the strength against progress of cracks is increased at each of the respective ridgeline portions at which first main surface 12a at first main surface side outer layer portion 15b crosses first end surface 12e and second end surface 12f. Accordingly, irrespective of whether multilayer ceramic capacitor 10 according to the present preferred embodiment has a small size or a large size, the impact resistance can be improved at each of the ridgeline portions at which first main surface 12a at first main surface side outer layer portion 15b crosses first end surface 12e and second end surface 12f.

For example, at first main surface side outer layer portion 15b, each grain size in first dielectric region 14a is preferably more than or equal to about 0.5 µm and less than or equal to about 5 µm, and each grain size in second dielectric region 14b is preferably more than or equal to about 0.1 µm and less than or equal to about 0.5 µm. Accordingly, the grain size in first dielectric region 14a is larger than the grain size in second dielectric region 14b. Accordingly, at first main surface side outer layer portion 15b, the grain boundaries between the grains can be reduced, with the result that the advantageous effects of improving adhesion force between multilayer body 12 and outer electrode 24 can be obtained. As a result, in first main surface side outer layer portion 15b, moisture can be reduced or prevented from entering from the interface between outer electrode 24 and multilayer body 12.

Moreover, at first main surface side outer layer portion 15b, each grain size in second dielectric region 14b is smaller than each grain size in first dielectric region 14a. Thus, the number of grain boundaries in second dielectric region 14b is larger than the number of grain boundaries in first dielectric region 14a. When the number of grain boundaries in second dielectric region 14b is larger than the number of grain boundaries in first dielectric region 14a, each of the grain boundaries obstructs a dislocation responsible for plastic deformation to reduce or prevent progress of cracks resulting from the plastic deformation, because such a dislocation cannot move to pass over a grain boundary. Therefore, the small grain sizes and the increased number of grain boundaries increase strength against progress of cracks. Thus, even if a crack is generated in multilayer body 12, progress of the crack can be reduced or prevented at first main surface side outer layer portion 15b.

A thickness $d_1$ of a region of second dielectric region 14b located on the inner layer portion 15a side at first main surface side outer layer portion 15b preferably falls within, for example, a range of more than or equal to about 40% and less than or equal to about 60% of a height $D_1$ of first main surface side outer layer portion 15b in lamination direction x. In other words, this region is a location serving as a boundary between large and small grain sizes in dielectric layer 14 at first main surface side outer layer portion 15b. Accordingly, the advantageous effects of preventing progress of cracks can be sufficiently provided while reducing or preventing entry of moisture from the interface between outer electrode 24 and multilayer body 12 by improving adhesion force between outer electrode 24 and multilayer body 12 as described above.

In length direction z, a region of second dielectric region 14b located along each of the respective ridgeline portion sides on which first main surface 12a of multilayer body 12 at first main surface side outer layer portion 15b of multilayer body crosses first end surface 12e and second end surface 12f preferably ranges, for example, up to a location of about ½ of a length of an underlying electrode layer 26 disposed on first main surface 12a in length direction z. The region of second dielectric region 14b located along each of the ridgeline portion sides on which first main surface 12a of multilayer body 12 at first main surface side outer layer portion 15b of multilayer body 12 crosses first end surface 12e and second end surface 12f has a thickness along the ridgeline portion side of multilayer body 12, and the thickness is preferably, for example, more than or equal to about 30% of the height of first main surface side outer layer portion 15b in lamination direction x. Accordingly, the impact resistance can be improved at the corner portion of multilayer ceramic electronic component 10.

It should be noted that the thickness, along the ridgeline portion side of multilayer body 12, of the region of second dielectric region 14b located along each of the respective ridgeline portion sides on which first main surface 12a of multilayer body 12 at first main surface side outer layer portion 15b of multilayer body 12 crosses first end surface 12e and second end surface 12f refers to each of: a thickness $d_a$ on a straight line extending at an angle $\theta_1$ of about 45° with respect to first end surface 12e and extending from an apex of an angle at which an imaginary line $l_1$ on and along first main surface 12a of multilayer body 12 at first main surface side outer layer portion 15b of multilayer body 12 crosses an imaginary line $l_2$ on and along first end surface 12e; and a thickness $d_b$ on a straight line extending at an angle $\theta_2$ of about 45° with respect to second end surface 12f and extending from an apex of an angle at which imaginary line $l_1$ on and along first main surface 12a of multilayer body 12 at first main surface side outer layer portion 15b of multilayer body 12 crosses an imaginary line $l_3$ on and along second end surface 12f.

As shown in FIG. 2A to FIG. 4, multilayer body 12 includes second main surface side outer layer portion 15c that is located on the second main surface 12b side and that is defined by the plurality of dielectric layers 14 located between second main surface 12b and each of the outermost surface of inner layer portion 15a on the second main surface 12b side and the extension line of the outermost surface.

As shown in FIG. 2A to FIG. 4, second main surface side outer layer portion 15c is defined by first dielectric region 14a and second dielectric region 14b in which grain sizes are smaller than those in first dielectric region 14a.

At second main surface side outer layer portion 15c, as shown in FIGS. 2A, 2D, and 2E, first dielectric region 14a includes an LT surface having a trapezoidal or substantially trapezoidal shape, and is located on the second main surface 12b side of second main surface side outer layer portion 15c. Second dielectric region 14b includes an LT surface having a substantially fishhook shape, and is located on the inner layer portion 15a side of second main surface side outer layer portion 15c and each of the respective ridgeline portion sides on which second main surface 12b at second main surface side outer layer portion 15c crosses first end surface 12e and second end surface 12f. Therefore, the number of grain boundaries on the inner layer portion 15a side of second main surface side outer layer portion 15c on which second dielectric region 14b is located and each of the respective ridgeline portion sides on which second main surface 12b at second main surface side outer layer portion 15c crosses first end surface 12e and second end surface 12f is larger than the number of grain boundaries on the second main surface 12b side of second main surface side outer layer portion 15c on which first dielectric region 14a is located. Generally, a dislocation responsible for plastic deformation cannot move to pass over a grain boundary. Thus, each of the grain boundaries obstructs the dislocation, so as to reduce or prevent progress of cracks resulting from the plastic deformation. Therefore, the small grain sizes and the increased number of grain boundaries lead to increased strength against progress of cracks. Thus, even if a crack is generated in multilayer body 12, progress of the crack can be reduced or prevented.

In other words, according to the present preferred embodiment, at second main surface side outer layer portion 15c, the grain sizes in first dielectric region 14a are larger than the grain sizes in second dielectric region 14b. Accordingly, the grain boundaries between the grains can be reduced, such that the advantageous effects of improving adhesion force between multilayer body 12 and outer electrode 24 can be obtained. As a result, moisture can be reduced or prevented from entering from the interface between outer electrode 24 and multilayer body 12.

Further, in the present preferred embodiment, second dielectric region 14b is located not only on the inner layer portion 15a side of second main surface side outer layer portion 15c but also on each of the respective ridgeline portion sides on which second main surface 12b at second main surface side outer layer portion 15c crosses first end surface 12e and second end surface 12f. Moreover, the number of grain boundaries in second dielectric region 14b is larger than the number of grain boundaries in first dielectric region 14a. Thus, a dislocation responsible for plastic deformation is also reduced or prevented at each of the respective ridgeline portions at which second main surface 12b at second main surface side outer layer portion 15c crosses first end surface 12e and second end surface 12f. Accordingly, strength against progress of cracks is increased. Here, when multilayer ceramic capacitor 10 is large, the weight thereof is large, with the result that a large impact is applied to the ridgeline portion. Thus, an impact resistance of the ridgeline portion is decreased. However, in multilayer ceramic capacitor 10 according to the present preferred embodiment, since second dielectric region 14b is located on each of the respective ridgeline portion sides on which second main surface 12b at second main surface side outer layer portion 15c crosses first end surface 12e and second end surface 12f, the strength against progress of cracks is increased at each of the respective ridgeline portions at which second main surface 12b at second main surface side outer layer portion 15c crosses first end surface 12e and second end surface 12f. Accordingly, irrespective of whether multilayer ceramic capacitor 10 according to the present preferred embodiment has a small size or a large size, the impact resistance can be improved at each of the respective ridgeline portions at which second main surface 12b at second main surface side outer layer portion 15c crosses first end surface 12e and second end surface 12f.

For example, at second main surface side outer layer portion 15c, each grain size in first dielectric region 14a is preferably more than or equal to about 0.5 μm and less than or equal to about 5 μm, and each grain size in second dielectric region 14b is preferably more than or equal to about 0.1 μm and less than or equal to about 0.5 μm. Accordingly, at second main surface side outer layer portion 15c, the grain size in first dielectric region 14a is larger than the grain size in second dielectric region 14b. Accordingly, at second main surface side outer layer portion 15c, the grain boundaries between the grains can be reduced, with the result that the advantageous effects of improving adhesion force between multilayer body 12 and outer electrode 24 can be obtained. As a result, moisture can be reduced or prevented from entering from the interface between outer electrode 24 and multilayer body 12.

Moreover, in second main surface side outer layer portion 15c, each grain size in second dielectric region 14b is smaller than each grain size in first dielectric region 14a. Thus, the number of grain boundaries in second dielectric region 14b is larger than the number of grain boundaries in first dielectric region 14a. When the number of grain boundaries in second dielectric region 14b is larger than the number of grain boundaries in first dielectric region 14a, each of the grain boundaries obstructs a dislocation responsible for plastic deformation to suppress progress of crack resulting from plastic deformation, because such a dislocation cannot move to pass over a grain boundary. Therefore, the small grain sizes and the increased number of grain boundaries lead to increased strength against progress of cracks. Thus, even if a crack is generated in multilayer body 12, progress of the crack can be reduced or prevented at second main surface side outer layer portion 15c.

A thickness $d_2$ of a region of second dielectric region 14b located on the inner layer portion 15a side at second main surface side outer layer portion 15c preferably falls within, for example, a range of more than or equal to 40% and less than or equal to about 60% of height $D_2$ of first main surface side outer layer portion 15b in lamination direction x. (In other words, this region is a location defining and functioning as a boundary between large and small grain sizes in dielectric layer 14 at first main surface side outer layer portion 15b.) Accordingly, the advantageous effects of preventing progress of cracks can be sufficiently provided while reducing or preventing entry of moisture from the interface between outer electrode 24 and multilayer body 12 by improving adhesion force between outer electrode 24 and multilayer body 12 as described above.

In length direction z, a region of second dielectric region 14b located along each of the respective ridgeline portion sides on which second main surface 12b of multilayer body 12 at second main surface side outer layer portion 15c of multilayer body 12 crosses first end surface 12e and second end surface 12f preferably ranges up to, for example, the location of about ½ of the length of underlying electrode layer 26 disposed on second main surface 12b in length direction z. The region of second dielectric region 14b located along each of the respective ridgeline portion sides on which second main surface 12b of multilayer body 12 at second main surface side outer layer portion 15c of multilayer body 12 crosses first end surface 12e and second end surface 12f has a thickness along the ridgeline portion side of multilayer body 12, and the thickness is preferably, for example, more than or equal to about 30% of the height of second main surface side outer layer portion 15c in lamination direction x. Accordingly, the impact resistance can be improved at the corner portion of multilayer ceramic capacitor 10.

It should be noted that the thickness, along the ridgeline portion side of multilayer body 12, of the region of second dielectric region 14b located along each of the respective ridgeline portion sides on which second main surface 12b of multilayer body 12 at second main surface side outer layer portion 15c of multilayer body 12 crosses first end surface 12e and second end surface 12f refers to each of: a thickness $d_c$ on a straight line extending at an angle $\theta_3$ of about 45° with respect to first end surface 12e and extending from an apex of an angle at which an imaginary line $l_4$ on and along second main surface 12b of multilayer body 12 at second main surface side outer layer portion 15c of multilayer body 12 crosses imaginary line $l_2$ on and along first end surface 12e; and a thickness $d_d$ on a straight line extending at an angle $\theta_4$ of about 45° with respect to second end surface 12f and extending from an apex of an angle at which imaginary line $l_4$ on and along second main surface 12b of multilayer body 12 at second main surface side outer layer portion 15c of multilayer body 12 crosses imaginary line $l_3$ on and along second end surface 12f.

As shown in FIG. 2A to FIG. 4, multilayer body 12 includes first side surface side outer layer portion 15d that is located on the first side surface 12c side and that is defined by the plurality of dielectric layers 14 located between first side surface 12c and the outermost surface of inner layer portion 15a on the first side surface 12c side.

As shown in FIG. 2A to FIG. 4, first side surface side outer layer portion 15d is defined by first dielectric region 14a and second dielectric region 14b in which grain sizes are smaller than those in first dielectric region 14a.

At first side surface side outer layer portion 15d, as shown in FIGS. 3A to 3C, first dielectric region 14a includes an LW surface having a trapezoidal or substantially trapezoidal shape, and is located on the first side surface 12c side of first side surface side outer layer portion 15d. Second dielectric region 14b includes an LW surface having a substantially fishhook shape, and is located on the inner layer portion 15a side of first side surface side outer layer portion 15 and each of the respective ridgeline portion sides on which first side surface 12c at first side surface side outer layer portion 15d crosses first end surface 12e and second end surface 12f. Therefore, the number of grain boundaries on the inner layer portion 15a side of first side surface side outer layer portion 15d on which second dielectric region 14b is located and each of the respective ridgeline portion sides on which first side surface 12c at first side surface side outer layer portion 15d crosses first end surface 12e and second end surface 12f is larger than the number of grain boundaries on the first side surface 12c side of first side surface side outer layer portion 15d on which first dielectric region 14a is located. Generally, a dislocation responsible for plastic deformation cannot move to pass over a grain boundary. Thus, each of the grain boundaries obstructs the dislocation, so as to reduce or prevent progress of cracks resulting from the plastic deformation. Therefore, the small grain sizes and the increased number of grain boundaries provide increased strength against progress of cracks. Thus, even if a crack is generated in multilayer body 12, progress of the crack can be reduced or prevented.

In other words, according to the present preferred embodiment, at first side surface side outer layer portion 15d, the grain sizes in first dielectric region 14a are larger than the grain sizes in second dielectric region 14b. Accordingly, the grain boundaries between the grains can be reduced, such that the advantageous effects of improving adhesion force between multilayer body 12 and outer electrode 24 can be obtained. As a result, moisture can be reduced or prevented from entering from the interface between outer electrode 24 and multilayer body 12.

Further, in the present preferred embodiment, second dielectric region 14b is located not only on the inner layer portion 15a side of first side surface side outer layer portion 15d but also on each of the respective ridgeline portion sides on which first side surface 12c at first side surface side outer layer portion 15d crosses first end surface 12e and second end surface 12f. Moreover, the number of grain boundaries in second dielectric region 14b is larger than the number of grain boundaries in first dielectric region 14a. Thus, a dislocation responsible for plastic deformation is also reduced or prevented at each of the ridgeline portions at which first side surface 12c of first side surface side outer layer portion 15d crosses first end surface 12e and second end surface 12f. Accordingly, strength against progress of cracks is increased. Here, when multilayer ceramic capacitor 10 is large, the weight thereof is large, with the result that a large impact is applied to the ridgeline portion. Thus, an impact resistance of the ridgeline portion is decreased. However, in multilayer ceramic capacitor 10 according to the present preferred embodiment, since second dielectric region 14b is located on each of the respective ridgeline portion sides on which first side surface 12c at first side surface side outer layer portion 15d crosses first end surface 12e and second end surface 12f, the strength against progress of cracks is increased at each of the respective ridgeline portions at which first side surface 12c of first side surface side outer layer portion 15d crosses first end surface 12e and second end surface 12f. Accordingly, irrespective of whether multilayer ceramic capacitor 10 according to the present preferred embodiment has a small size or a large size, the impact resistance can be improved at each of the respective ridgeline portions at which first side surface 12c of first side surface side outer layer portion 15d crosses first end surface 12e and second end surface 12f.

For example, at first side surface side outer layer portion 15d, each grain size in first dielectric region 14a is preferably more than or equal to about 0.5 μm and less than or equal to about 5 μm, and each grain size in second dielectric region 14b is preferably more than or equal to about 0.1 μm and less than or equal to about 0.5 μm. Accordingly, at first side surface side outer layer portion 15d, the grain size in first dielectric region 14a is larger than the grain size in second dielectric region 14b. Accordingly, at first side surface side outer layer portion 15d, the grain boundaries between the grains can be reduced, with the result that the advantageous effects of improving adhesion force between multilayer body 12 and outer electrode 24 can be obtained. As a result, moisture can be reduced or prevented from entering from the interface between outer electrode 24 and multilayer body 12.

Moreover, at first side surface side outer layer portion 15d, each grain size in second dielectric region 14b is smaller than each grain size in first dielectric region 14a. Thus, the number of grain boundaries in second dielectric region 14b is larger than the number of grain boundaries in first dielectric region 14a. When the number of grain boundaries in second dielectric region 14b is larger than the number of grain boundaries in first dielectric region 14a, each of the grain boundaries obstructs a dislocation responsible for plastic deformation to reduce or prevent progress of cracks resulting from plastic deformation, because such a dislocation cannot move to pass over a grain boundary. Therefore, the small grain sizes and the increased number of grain boundaries provide increased strength against progress of cracks. Thus, even if a crack is generated in multilayer body 12, progress of the crack can be reduced or prevented at first side surface side outer layer portion 15d.

A thickness $d_3$ of a region of second dielectric region 14b located on the inner layer portion 15a side at first side surface side outer layer portion 15d preferably falls within, for example, a range of more than or equal to about 40% and less than or equal to about 60% of a width $D_3$ of first main surface side outer layer portion 15b in width direction x. In other words, this region is a location defining and functioning as a boundary between large and small grain sizes in dielectric layer 14 at first side surface side outer layer portion 15d. Accordingly, the advantageous effects of preventing progress of cracks can be sufficiently provided while reducing or preventing entry of moisture from the interface between outer electrode 24 and multilayer body 12 by improving adhesion force between outer electrode 24 and multilayer body 12 as described above.

In length direction z, a region of second dielectric region 14b located along each of the respective ridgeline portion sides on which first side surface 12c of multilayer body 12 at first side surface side outer layer portion 15d of multilayer body crosses first end surface 12e and second end surface 12f preferably ranges up to, for example, the location of about ½ of the length of underlying electrode layer 26 disposed on first side surface 12c in length direction z. The region of second dielectric region 14b located along each of the respective ridgeline portion sides on which first side surface 12c of multilayer body 12 at first side surface side outer layer portion 15d of multilayer body 12 crosses first end surface 12e and second end surface 12f has a thickness along the ridgeline portion side of multilayer body 12, and the thickness is preferably, for example, more than or equal to about 30% of the width of first side surface side outer layer portion 15d in width direction y. Accordingly, the impact resistance can be improved at the corner portion of multilayer ceramic capacitor 10.

It should be noted that the thickness, along the ridgeline portion side of multilayer body 12, of the region of second dielectric region 14b located along each of the respective ridgeline portion sides on which first side surface 12c of multilayer body 12 at first side surface side outer layer portion 15d of multilayer body 12 crosses first end surface 12e and second end surface 12f refers to each of: a thickness $d_e$ on a straight line extending an angle $\theta_5$ of about 45° with respect to first end surface 12e and extending from an apex of an angle at which an imaginary line $l_5$ on and first side surface 12c of multilayer body 12 at first surface side outer layer portion 15d of multilayer body 12 crosses imaginary line $l_2$ on and along first end surface 12e; and a thickness $d_f$ on a straight line extending an angle $\theta_6$ of about 45° with respect to second end surface 12f and extending from an apex of an angle at which imaginary line $l_5$ on and along first side surface 12c of multilayer body 12 at first side surface side outer layer portion 15d of multilayer body 12 crosses imaginary line $l_3$ on and along second end surface 12f.

As shown in FIG. 2A to FIG. 4, multilayer body 12 includes second side surface side outer layer portion 15e that is located on the second side surface 12d side and that is constituted of the plurality of dielectric layers 14 located between second side surface 12d and the outermost surface of inner layer portion 15a on the first side surface 12c side.

As shown in FIG. 2A to FIG. 4, second side surface side outer layer portion 15e is defined by first dielectric region 14a and second dielectric region 14b in which grain sizes are smaller than those in first dielectric region 14a.

At second side surface side outer layer portion 15e, as shown in FIGS. 3A, 3D, and 3E, first dielectric region 14a includes an LW surface having a trapezoidal or substantially trapezoidal shape, and is located on the second side surface 12d side of second side surface side outer layer portion 15e. Second dielectric region 14b includes an LW surface having a substantially fishhook shape, and is located on the inner layer portion 15a side of second side surface side outer layer portion 15e and each of the respective ridgeline portion sides on which second side surface 12d at second side surface side outer layer portion 15e crosses first end surface 12e and second end surface 12f. Therefore, the number of grain boundaries on the inner layer portion 15a side of second side surface side outer layer portion 15e on which second dielectric region 14b is located and each of the respective ridgeline portion sides on which second side surface 12d at second side surface side outer layer portion 15e crosses first end surface 12e and second end surface 12f is larger than the number of grain boundaries on the second side surface 12d side of second side surface side outer layer portion 15e on which first dielectric region 14a is located. Generally, a dislocation responsible for plastic deformation cannot move to pass over a grain boundary. Thus, each of the grain boundaries obstructs the dislocation, so as to reduce or prevent progress of cracks resulting from the plastic deformation. Therefore, the small grain sizes and the increased number of grain boundaries lead to increased strength against progress of cracks. Thus, even if a crack is generated in multilayer body 12, progress of the crack can be reduced or prevented.

In other words, according to the present preferred embodiment, at second side surface side outer layer portion 15e, the grain sizes in first dielectric region 14a are larger than the grain sizes in second dielectric region 14b. Accordingly, the grain boundaries between the grains can be reduced, such that the advantageous effects of improving adhesion force between multilayer body 12 and outer electrode 24 can be obtained. As a result, moisture can be reduced or prevented from entering from the interface between outer electrode 24 and multilayer body 12.

Further, in the present preferred embodiment, second dielectric region 14b is located not only on the inner layer portion 15a side of second side surface side outer layer portion 15e but also on each of the respective ridgeline portion sides on which second side surface 12d at second side surface side outer layer portion 15e crosses first end surface 12e and second end surface 12f. Moreover, the number of grain boundaries in second dielectric region 14b is larger than the number of grain boundaries in first dielectric region 14a. Thus, a dislocation responsible for plastic deformation is also reduced or prevented at each of the respective ridgeline portions at which second side surface 12d of second side surface side outer layer portion 15e crosses first end surface 12e and second end surface 12f. Accordingly, strength against progress of cracks is increased. Here, when multilayer ceramic capacitor 10 is large, the weight thereof is large, with the result that a large impact is applied to the ridgeline portion. Thus, an impact resistance of the ridgeline portion is decreased. However, in multilayer ceramic capacitor 10 according to the present preferred embodiment, since second dielectric region 14b is located on each of the respective ridgeline portion sides on which second side surface 12d at second side surface side outer layer portion 15e crosses first end surface 12e and second end surface 12f, the strength against progress of cracks is increased at each of the respective ridgeline portions at which second side surface 12d of second side surface side outer layer portion 15e crosses first end surface 12e and second end surface 12f. Accordingly, irrespective of whether multilayer ceramic capacitor 10 according to the present preferred embodiment has a small size or a large size, the impact resistance can be improved at each of the respective ridgeline portions at which second side surface 12d at second side surface side outer layer portion 15e crosses first end surface 12e and second end surface 12f.

For example, at second side surface side outer layer portion 15e, each grain size in first dielectric region 14a is preferably more than or equal to about 0.5 μm and less than or equal to about 5 μm, and each grain size in second dielectric region 14b is preferably more than or equal to about 0.1 μm and less than or equal to about 0.5 μm. Accordingly, at second side surface side outer layer portion 15e, the grain size in first dielectric region 14a is larger than the grain size in second dielectric region 14b. Accordingly, in second side surface side outer layer portion 15e, the grain boundaries between the grains can be reduced, with the result that the advantageous effects of improving adhesion force between multilayer body 12 and outer electrode 24 can be obtained. As a result, moisture can be reduced or prevented from entering from the interface between outer electrode 24 and multilayer body 12.

Moreover, at second side surface side outer layer portion 15e, each grain size in second dielectric region 14b is smaller than each grain size in first dielectric region 14a. Thus, the number of grain boundaries in second dielectric region 14b is larger than the number of grain boundaries in first dielectric region 14a. When the number of grain boundaries in second dielectric region 14b is larger than the number of grain boundaries in first dielectric region 14a, each of the grain boundaries obstructs a dislocation responsible for plastic deformation to reduce or prevent progress of cracks resulting from plastic deformation, because such a dislocation cannot move to pass over a grain boundary. Therefore, the small grain sizes and the increased number of grain boundaries lead to increased strength against progress of cracks. Thus, even if a crack is generated in multilayer body 12, progress of the crack can be reduced or prevented at second side surface side outer layer portion 15e.

A thickness $d_4$ of a region of second dielectric region 14b located on the inner layer portion 15a side at second side surface side outer layer portion 15e preferably falls within, for example, a range of more than or equal to about 40% and less than or equal to about 60% of a width $D_4$ of second side surface side outer layer portion 15e in width direction x. In other words, this region is a location defining and functioning as a boundary between large and small grain sizes in dielectric layer 14 at second side surface side outer layer portion 15e. Accordingly, the advantageous effects of preventing progress of cracks can be sufficiently achieved while reducing or preventing entry of moisture from the interface between outer electrode 24 and multilayer body 12 by improving adhesion force between outer electrode 24 and multilayer body 12 as described above.

In length direction z, a region of second dielectric region 14b located along each of the respective ridgeline portion sides on which second side surface 12d of multilayer body 12 at second side surface side outer layer portion 15e of multilayer body 12 crosses first end surface 12e and second end surface 12f preferably ranges, for example, up to the location of about ½ of the length of underlying electrode layer 26 disposed on second side surface 12d in length direction z. The region of second dielectric region 14b located along each of the respective ridgeline portion sides on which second side surface 12d of multilayer body 12 at second side surface side outer layer portion 15e of multilayer body 12 crosses first end surface 12e and second end surface 12f has a thickness along the ridgeline portion side of multilayer body 12, and the thickness is preferably, for example, more than or equal to about 30% of the width of second side surface side outer layer portion 15e in width direction y. Accordingly, the impact resistance can be improved at the corner portion of multilayer ceramic capacitor 10.

It should be noted that the thickness, along the ridgeline portion side of multilayer body 12, of the region of second dielectric region 14b located along each of the respective ridgeline portion sides on which second side surface 12d of multilayer body 12 at second side surface side outer layer portion 15e of multilayer body 12 crosses first end surface 12e and second end surface 12f refers to each of: a thickness $d_g$ on a straight line extending an angle $\theta_7$ of about 45° with respect to first end surface 12e and extending from an apex of an angle at which an imaginary line $l_6$ on and along second side surface 12d of multilayer body 12 at second side surface side outer layer portion 15e of multilayer body 12 crosses imaginary line $l_2$ on and along first end surface 12e; and a thickness $d_h$ on a straight line extending an angle $\theta_8$ of about 45° with respect to second end surface 12f and extending from an apex of an angle at which imaginary line $l_6$ on and along second side surface 12d of multilayer body 12 at second side surface side outer layer portion 15e of multilayer body 12 crosses imaginary line $l_3$ on and along second end surface 12f.

At first main surface side outer layer portion 15b, a metal of inner electrode layer 16 is diffused. An amount of diffusion of the metal of inner electrode layer 16 in dielectric layer 14 (second dielectric region 14b) located on the inner layer portion 15a side of first main surface side outer layer portion 15b is less than an amount of diffusion of the metal of inner electrode layer 16 in dielectric layer 14 (first dielectric region 14a) located on the first main surface 12a side of first main surface side outer layer portion 15b. An amount of diffusion of the metal of inner electrode layer 16 in dielectric layer 14 (second dielectric region 14b) located along each of the respective ridgeline portion sides on which first main surface 12a of multilayer body 12 at first main surface side outer layer portion 15b crosses first end surface 12e and second end surface 12f is less than an amount of diffusion of the metal of inner electrode layer 16 in dielectric layer 14 (first dielectric region 14a) located on the first main surface 12a side of first main surface side outer layer portion 15b. Here, by diffusing the metal of inner electrode layer 16 in dielectric layers 14 at first main surface side outer layer portion 15b, an advantageous effect of reducing or preventing grain growth in dielectric layers 14 is obtained. Therefore, each grain size in the dielectric layer located on the first main surface 12a side of first main surface side outer layer portion 15b is large, whereas each grain size in the dielectric layer located on the inner layer portion 15a side of first main surface side outer layer portion 15b is small. Accordingly, the number of grain boundaries in second dielectric region 14b is large. Generally, a dislocation responsible for plastic deformation cannot move to pass over a grain boundary. Thus, each of the grain boundaries obstructs the dislocation, so as to reduce or prevent progress of cracks resulting from the plastic deformation. Therefore, the small grain sizes and the increased number of grain boundaries lead to increased strength against progress of cracks. Thus, even if a crack is generated in multilayer body 12, progress of the crack can be reduced or prevented.

In other words, according to the present preferred embodiment, at first main surface side outer layer portion 15b, the grain sizes in first dielectric region 14a are larger than the grain sizes in second dielectric region 14b. Accordingly, the grain boundaries between the grains can be reduced, such that the advantageous effects of improving adhesion force between multilayer body 12 and outer electrode 24 can be obtained. As a result, moisture can be reduced or prevented from entering from the interface between outer electrode 24 and multilayer body 12.

Also, the same applies to each grain size in dielectric layer 14 located along each of the respective ridgeline portion sides on which first main surface 12a of multilayer body 12 at first main surface side outer layer portion 15b crosses first end surface 12e and second end surface 12f. Due to a difference in the amount of diffusion, the grain size in dielectric layer 14 located along each of the respective ridgeline portion sides on which first main surface 12a of multilayer body 12 at first main surface side outer layer portion 15b crosses first end surface 12e and second end surface 12f is less than the grain size in dielectric layer 14 located on the first main surface 12a side of first main surface side outer layer portion 15b. Therefore, the number of grain boundaries in dielectric layer 14 located along each of the respective ridgeline portion sides on which first main surface 12a at first main surface side outer layer portion 15b crosses first end surface 12e and second end surface 12f is larger than the number of grain boundaries in first dielectric region 14a. Accordingly, a dislocation responsible for plastic deformation is reduced or prevented also at the ridgeline portion, thus resulting in increased strength against progress of cracks. Accordingly, even when multilayer ceramic capacitor 10 is a large-size multilayer ceramic capacitor that has an increased weight and that receives a large impact on a corner portion, the strength is increased against the progress of the cracks in dielectric layer located along the ridgeline portion side. Thus, an impact resistance at the corner portion of multilayer ceramic capacitor 10 can be improved.

At second main surface side outer layer portion 15c, the metal of inner electrode layer 16 is diffused. An amount of diffusion of the metal of inner electrode layer 16 in dielectric layer 14 (second dielectric layer 14b) located on the inner layer portion 15a side of second main surface side outer layer portion 15c is less than an amount of diffusion of the metal of inner electrode layer 16 in dielectric layer 14 (first dielectric region 14a) located on the second main surface 12b side of second main surface side outer layer portion 15c. An amount of diffusion of the metal of inner electrode layer 16 in dielectric layer 14 (second dielectric region 14b) located along each of the respective ridgeline portion sides on which second main surface 12b of multilayer body 12 at second main surface side outer layer portion 15c crosses first end surface 12e and second end surface 12f is less than an amount of diffusion of the metal of inner electrode layer 16 in dielectric layer 14 (first dielectric region 14a) located on the second main surface 12b side of second main surface side outer layer portion 15c. Here, by diffusing the metal of inner electrode layer 16 in dielectric layers 14 at second main surface side outer layer portion 15c, the advantageous effects of reducing or preventing grain growth in dielectric layers 14 is obtained. Therefore, each grain size in the dielectric layer located on the second main surface 12b side of second main surface side outer layer portion 15c is large, whereas each grain size in the dielectric layer located on the inner layer portion 15a side of second main surface side outer layer portion 15c is small. Accordingly, the number of grain boundaries in second dielectric region 14b is large. Generally, a dislocation responsible for plastic deformation cannot move to pass over a grain boundary. Thus, each of the grain boundaries obstructs the dislocation, so as to reduce or prevent progress of cracks resulting from the plastic deformation. Therefore, the small grain sizes and the increased number of grain boundaries lead to increased strength against progress of cracks. Thus, even if a crack is generated in multilayer body 12, progress of the crack can be reduced or prevented.

In other words, according to the present preferred embodiment, at second main surface side outer layer portion 15c, the grain sizes in first dielectric region 14a are larger than the grain sizes in second dielectric region 14b. Accordingly, the grain boundaries between the grains can be reduced, such that the advantageous effects of improving adhesion force between multilayer body 12 and outer electrode 24 can be obtained. As a result, moisture can be reduced or prevented from entering from the interface between outer electrode 24 and multilayer body 12.

Also, the same applies to each grain size in dielectric layer 14 located along each of the respective ridgeline portion sides on which second main surface 12b of multilayer body 12 at second main surface side outer layer portion 15c crosses first end surface 12e and second end surface 12f. Due to a difference in the amount of diffusion, the grain size in dielectric layer 14 located along each of the respective ridgeline portion sides on which second main surface 12b of multilayer body 12 at second main surface side outer layer portion 15c crosses first end surface 12e and second end surface 12f is less than the grain size in dielectric layer 14 located on the second main surface 12b side of second main surface side outer layer portion 15c. Therefore, the number of grain boundaries in dielectric layer 14 located along each of the respective ridgeline portion sides on which second main surface 12b of multilayer body 12 at second main surface side outer layer portion 15c crosses first end surface 12e and second end surface 12f is larger than the number of grain boundaries in first dielectric region 14a. Accordingly, a dislocation responsible for plastic deformation is reduced or prevented also at the ridgeline portion, thus resulting in increased strength against progress of cracks. Accordingly, even when multilayer ceramic capacitor 10 is a large-size multilayer ceramic capacitor that has an increased weight and that receives a large impact on a corner portion, the strength is increased against the progress of cracks in dielectric layer 14 located along the ridgeline portion side. Thus, an impact resistance at the corner portion of multilayer ceramic capacitor 10 can be improved.

Moreover, by providing second main surface side outer layer portion 15c, second main surface 12b can be mounted to face a mounting surface side, such that selection of a direction of multilayer ceramic capacitor 10 can be unnecessary when taping multilayer ceramic capacitor 10 or when mounting it on a mounting substrate.

At first side surface side outer layer portion 15d, the metal of inner electrode layer 16 is diffused. An amount of diffusion of the metal of inner electrode layer 16 in dielectric layer 14 (second dielectric region 14b) located on the inner layer portion 15a side of first side surface side outer layer portion 15d is less than an amount of diffusion of the metal of inner electrode layer 16 in dielectric layer 14 (first dielectric region 14a) located on the first side surface 12c side of first side surface side outer layer portion 15d. An amount of diffusion of the metal of inner electrode layer 16 in dielectric layer 14 (second dielectric region 14b) located along each of the respective ridgeline portion sides on which first side surface 12c of multilayer body 12 at first side surface side outer layer portion 15d crosses first end surface 12e and second end surface 12f is less than an amount of diffusion of the metal of inner electrode layer 16 in dielectric layer 14 (first dielectric region 14a) located on the first side surface 12c side of first side surface side outer layer portion 15d. Here, by diffusing the metal of inner electrode layer 16 in dielectric layers 14 at first side surface side outer layer portion 15d, the advantageous effects of reducing or preventing grain growth in dielectric layers 14 is obtained. Therefore, each grain size in the dielectric layer located on the first side surface 12c side of first side surface side outer layer portion 15d is large, whereas each grain size in the dielectric layer located on the inner layer portion 15a side of first side surface side outer layer portion 15d is small. Accordingly, the number of grain boundaries in second dielectric region 14b located on the inner layer portion 15a side of first side surface side outer layer portion 15d is increased. Generally, a dislocation responsible for plastic deformation cannot move to pass over a grain boundary. Thus, each of the grain boundaries obstructs the dislocation, so as to reduce or prevent the progress of cracks resulting from the plastic deformation. Therefore, the small grain sizes and the increased number of grain boundaries lead to increased strength against progress of cracks. Thus, even if a crack is generated in multilayer body 12, progress of the crack can be reduced or prevented.

In other words, according to the present preferred embodiment, at first side surface side outer layer portion 15d, the grain sizes in first dielectric region 14a are larger than the grain sizes in second dielectric region 14b. Accordingly, the grain boundaries between the grains can be reduced, such that the advantageous effects of improving adhesion force between multilayer body 12 and outer electrode 24 can be obtained. As a result, moisture can be reduced or prevented from entering from the interface between outer electrode 24 and multilayer body 12.

Moreover, by providing first side surface side outer layer portion 15d, first side surface 12c can be mounted to face a mounting surface side, such that selection of a direction of multilayer ceramic capacitor 10 can be unnecessary when taping multilayer ceramic capacitor 10 or when mounting it on a mounting substrate.

At second side surface side outer layer portion 15e, the metal of inner electrode layer 16 is diffused. An amount of diffusion of the metal of inner electrode layer 16 in dielectric layer 14 (second dielectric region 14b) located on the inner layer portion 15a side of second side surface side outer layer portion 15e is less than an amount of diffusion of the metal of inner electrode layer 16 in dielectric layer 14 (first dielectric region 14a) located on the second side surface 12d side of second side surface side outer layer portion 15e. An amount of diffusion of the metal of inner electrode layer 16 in dielectric layer 14 (second dielectric region 14b) located along each of the respective ridgeline portion sides on which second side surface 12d of multilayer body 12 at second side surface side outer layer portion 15e crosses first end surface 12e and second end surface 12f is less than an amount of diffusion of the metal of inner electrode layer 16 in dielectric layer 14 (first dielectric region 14a) located on the second side surface 12d side of second side surface side outer layer portion 15e. Here, by diffusing the metal of inner electrode layer 16 in dielectric layers 14 at second side surface side outer layer portion 15e, the advantageous effects of reducing or preventing grain growth in dielectric layers 14 is obtained. Therefore, each grain size in the dielectric layer located on the second side surface 12d side of second side surface side outer layer portion 15e is large, whereas each grain size in second dielectric region 14b located on the inner layer portion 15a side of second side surface side outer layer portion 15e is small. Accordingly, the number of grain boundaries in second dielectric region 14b located on the inner layer portion 15a side of second side surface side outer layer portion 15e is increased. Generally, a dislocation responsible for plastic deformation cannot move to pass over a grain boundary. Thus, each of the grain boundaries obstructs the dislocation, so as to reduce or prevent progress of cracks resulting from the plastic deformation. Therefore, the small grain sizes and the increased number of grain boundaries lead to increased strength against progress of crack. Thus, even if a crack is generated in multilayer body 12, progress of the crack can be reduced or prevented.

In other words, according to the present preferred embodiment, at second side surface side outer layer portion 15e, the grain sizes in first dielectric region 14a are larger than the grain sizes in second dielectric region 14b. Accordingly, the grain boundaries between the grains can be reduced, such that the advantageous effects of improving adhesion force between multilayer body 12 and outer electrode 24 can be obtained. As a result, moisture can be reduced or prevented from entering from the interface between outer electrode 24 and multilayer body 12.

At inner layer portion 15a, as shown in FIG. 2A to FIG. 4, the plurality of inner electrode layers 16 face each other in lamination direction x, and a third dielectric region 14c is formed between inner electrode layers 16. Third dielectric region 14c may be the same or substantially the same as one of first dielectric region 14a and second dielectric layer 14b, or may be different from both first dielectric region 14a and second dielectric region 14b.

Figure 5:
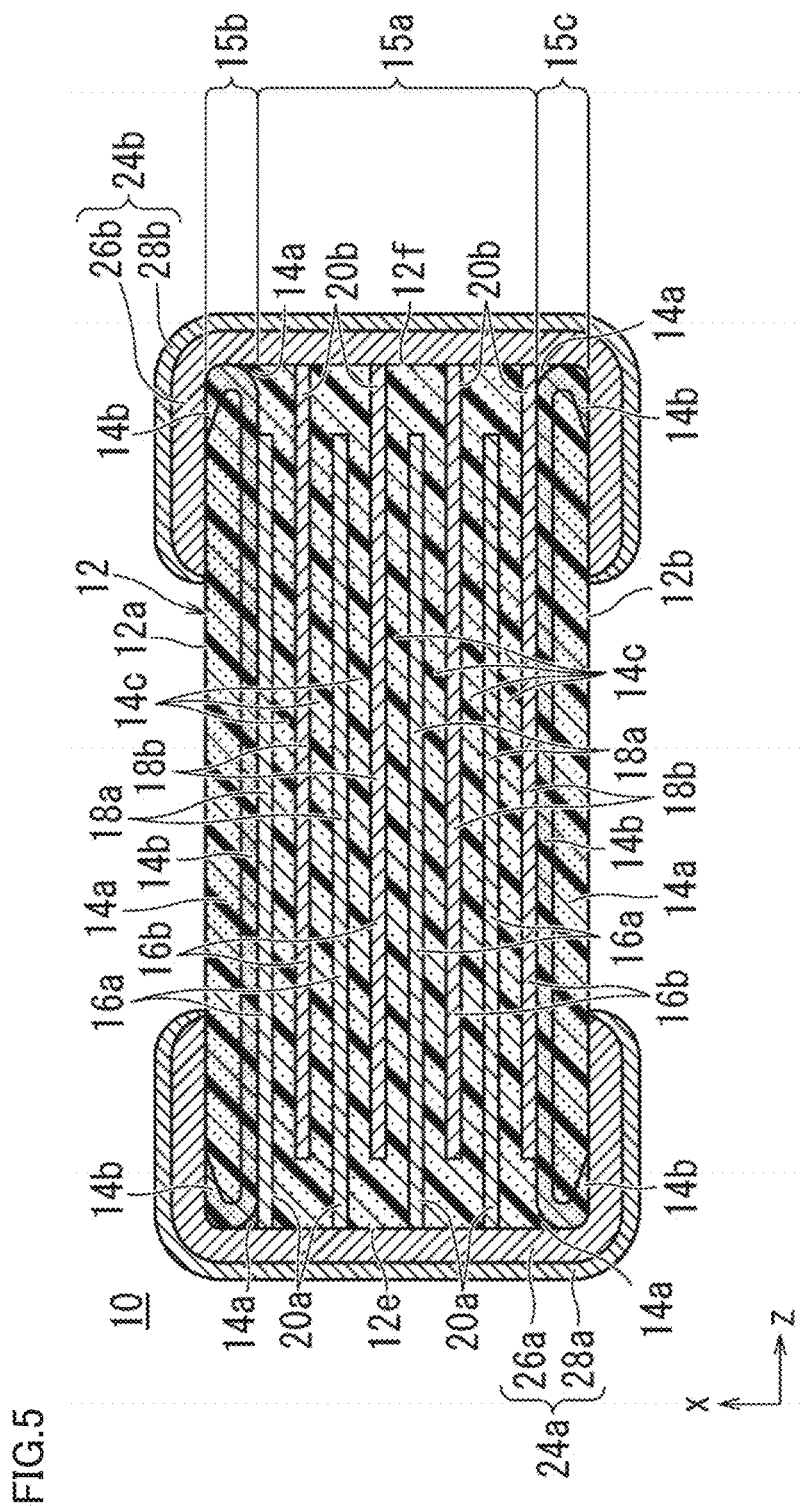
FIG. 5 is a cross sectional view taken along line II-II of FIG. 1 and showing that a first dielectric layer is also provided in a region surrounded by a second dielectric layer at a first outer layer portion, a first main surface, and a metal of an inner electrode layer.

It should be noted that as shown in FIG. 5, first dielectric region 14a may also be provided in a region surrounded by second dielectric region 14b at first main surface side outer layer portion 15b, first end surface 12e, and the metal of inner electrode layer 16, as well as a region surrounded by second dielectric region 14b at first main surface side outer layer portion 15b, second end surface 12f, and inner layer portion 15a. However, also in such a case, first dielectric region 14a is located on the first main surface 12a side of first main surface side outer layer portion 15b, and second dielectric region 14b is located on the inner layer portion 15a side of first main surface side outer layer portion 15b and on each of the respective ridgeline portion sides on which first main surface 12a at first main surface side outer layer portion 15b crosses first end surface 12e and second end surface 12f. Thus, even if a crack is generated in multilayer body 12, it is possible to reduce or prevent progress of the crack, to reduce or prevent entry of moisture from the interface between outer electrode 24 and multilayer body 12, and to improve the impact resistance at the corner portion of multilayer ceramic capacitor 10.

Moreover, as shown in FIG. 5, first dielectric region 14a may also be provided in a region surrounded by second dielectric region 14b at second main surface side outer layer portion 15c, first end surface 12e, and the metal of inner electrode layer 16, as well as a region surrounded by second dielectric region 14b at second main surface side outer layer portion 15c, second end surface 12f, and inner layer portion 15a. However, also in such a case, first dielectric region 14a is located on the second main surface 12b side of second main surface side outer layer portion 15c, and second dielectric region 14b is located on the inner layer portion 15a side of second main surface side outer layer portion 15c and on each of the respective ridgeline portion sides on which second main surface 12b at second main surface side outer layer portion 15c crosses first end surface 12e and second end surface 12f. Thus, even if a crack is generated in multilayer body 12, it is possible to reduce or prevent progress of the crack, to reduce or prevent entry of moisture from the interface between outer electrode 24 and multilayer body 12, and to improve the impact resistance at the corner portion of multilayer ceramic capacitor 10.

Figure 6:
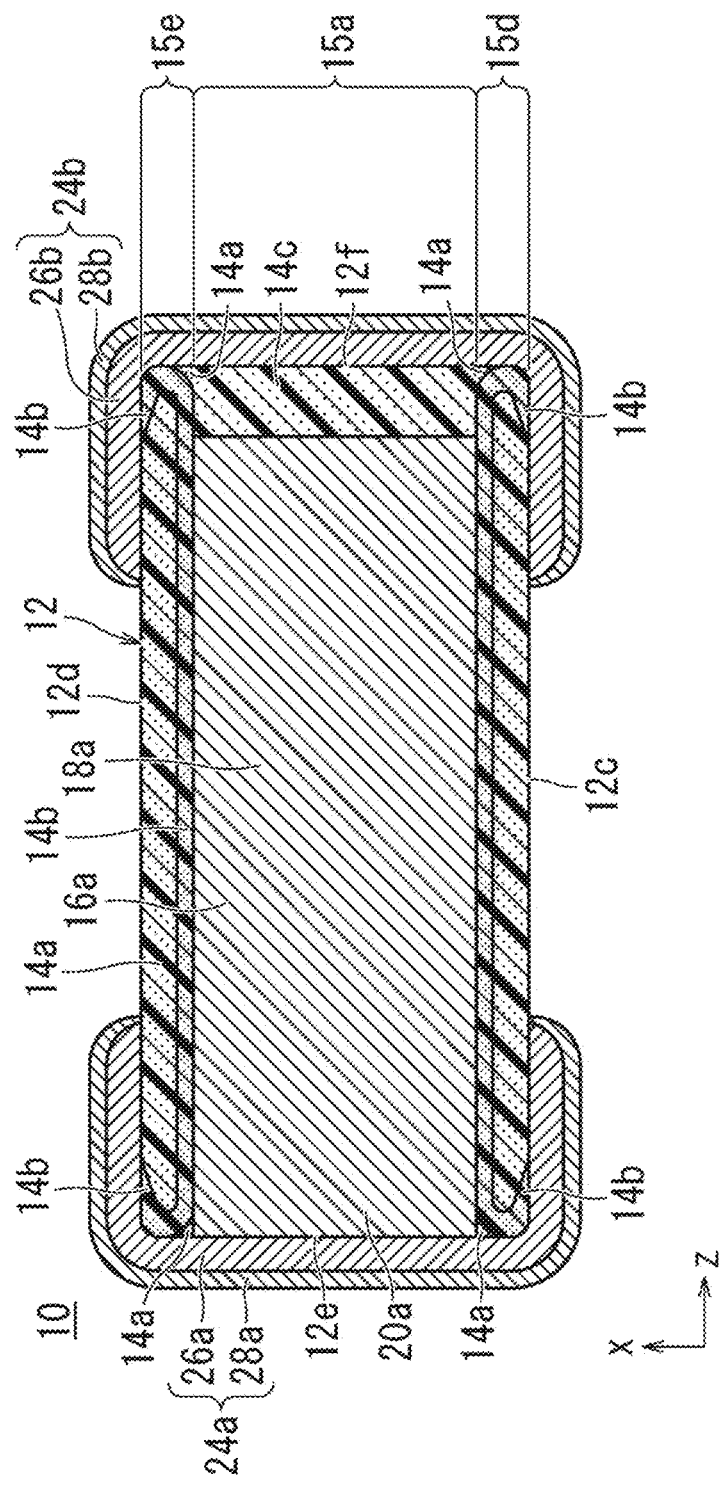
FIG. 6 is a cross sectional view taken along line II-II of FIG. 1 and showing that the first dielectric layer is also provided in the region surrounded by the second dielectric layer at the first outer layer portion, a first side surface, and the metal of the inner electrode layer.

Further, as shown in FIG. 6, first dielectric region 14a may also be provided in a region surrounded by second dielectric region 14b at first side surface side outer layer portion 15d, first end surface 12e, and the metal of inner electrode layer 16, as well as a region surrounded by second dielectric region 14b at first side surface side outer layer portion 15d, second end surface 12f, and inner layer portion 15a. However, also in such a case, first dielectric region 14a is located on the first side surface 12c side of first side surface side outer layer portion 15d, and second dielectric region 14b is located on the inner layer portion 15a side of first side surface side outer layer portion 15d and on each of the respective ridgeline portion sides on which first side surface 12c at first side surface side outer layer portion 15d crosses first end surface 12e and second end surface 12f. Thus, even if a crack is generated in multilayer body 12, it is possible to reduce or prevent progress of the crack, to reduce or prevent entry of moisture from the interface between outer electrode 24 and multilayer body 12, and to improve the impact resistance at the corner portion of multilayer ceramic capacitor 10.

Furthermore, as shown in FIG. 6, first dielectric region 14a may also be provided in a region surrounded by second dielectric region 14b at second side surface side outer layer portion 15e, first end surface 12e, and the metal of inner electrode layer 16, as well as a region surrounded by second dielectric region 14b at second side surface side outer layer portion 15e, second end surface 12f, and inner layer portion 15a. However, also in such a case, first dielectric region 14a is located on the second side surface 12d side of second side surface side outer layer portion 15e, and second dielectric region 14b is located on the inner layer portion 15a side of second side surface side outer layer portion 15e and on each of the respective ridgeline portion sides on which second side surface 12d at second side surface side outer layer portion 15e crosses first end surface 12e and second end surface 12f. Thus, even if a crack is generated in multilayer body 12, it is possible to reduce or prevent progress of the crack, to reduce or prevent entry of moisture from the interface between outer electrode 24 and multilayer body 12, and to improve the impact resistance at the corner portion of multilayer ceramic capacitor 10.

Figure 7:
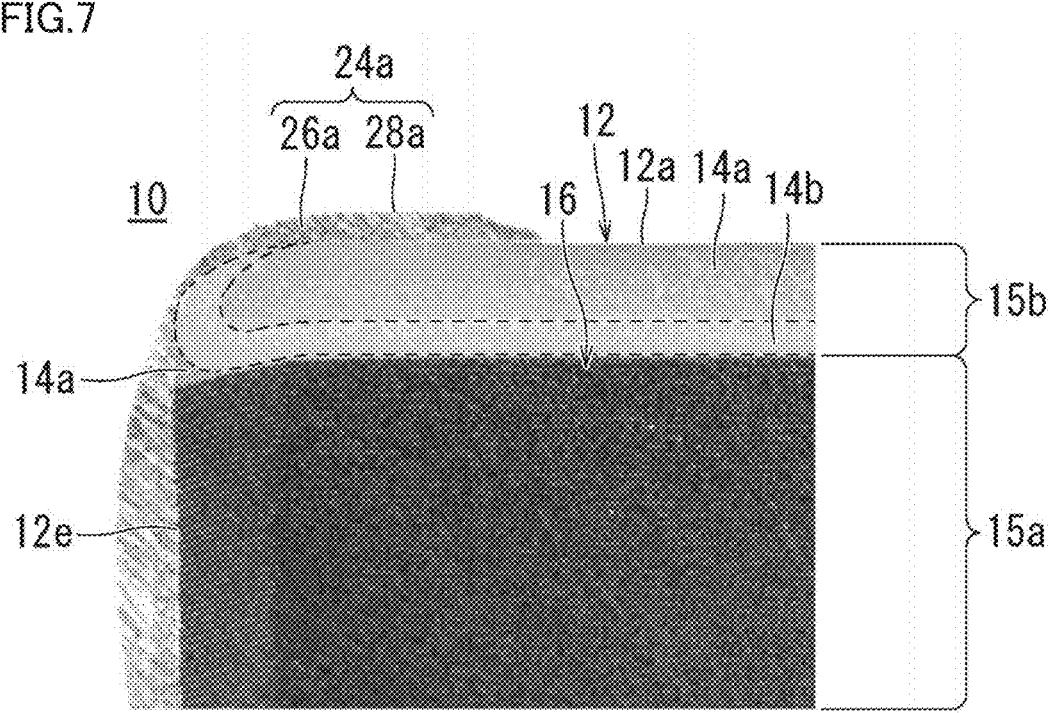
FIG. 7 shows an enlarged photograph of a cross section taken along line II-II of FIG. 1 and showing a multilayer ceramic capacitor according to a preferred embodiment of the present invention.

FIG. 7 shows a partial enlarged photograph of first main surface side outer layer portion 15b and inner layer portion 15a of multilayer body 12 at an LT cross section. With reference to FIG. 7, first dielectric region 14a is also provided in a range surrounded by second dielectric region 14b at first main surface side outer layer portion 15b, first end surface 12e, and the metal of inner electrode layer 16. However, first dielectric region 14a is located on the first main surface 12a side of first main surface side outer layer portion 15b, and second dielectric region 14b is located on the inner layer portion 15a side of first main surface side outer layer portion 15b and on each of the respective ridgeline portion sides on which first main surface 12a at first main surface side outer layer portion 15b crosses first end surface 12e and second end surface 12f. Thus, even if a crack is generated in multilayer body 12, it is possible to reduce or prevent progress of the crack, to reduce or prevent entry of moisture from the interface between outer electrode 24 and multilayer body 12, and to improve the impact resistance at the corner portion of multilayer ceramic capacitor 10. Here, the width of a first drawn electrode portion 20a of inner electrode layer 16 shown in FIG. 7 is narrowed.

Also in the case of second main surface side outer layer portion 15c, as with the content shown in FIG. 7, even when first dielectric region 14a is also provided in a range surrounded by second dielectric region 14b at second main surface side outer layer portion 15c, first end surface 12e, and the metal of inner electrode layer 16, first dielectric region 14a is located on the second main surface 12b side of second main surface side outer layer portion 15c, and second dielectric region 14b is located on the inner layer portion 15a side of second main surface side outer layer portion 15c and on each of the respective ridgeline portion sides on which second main surface 12b at second main surface side outer layer portion 15c crosses first end surface 12e and second end surface 12f. Thus, even if a crack is generated in multilayer body 12, it is possible to reduce or prevent progress of the crack, to reduce or prevent entry of moisture from the interface between outer electrode 24 and multilayer body 12, and to improve the impact resistance at the corner portion of multilayer ceramic capacitor 10.

Figure 8:
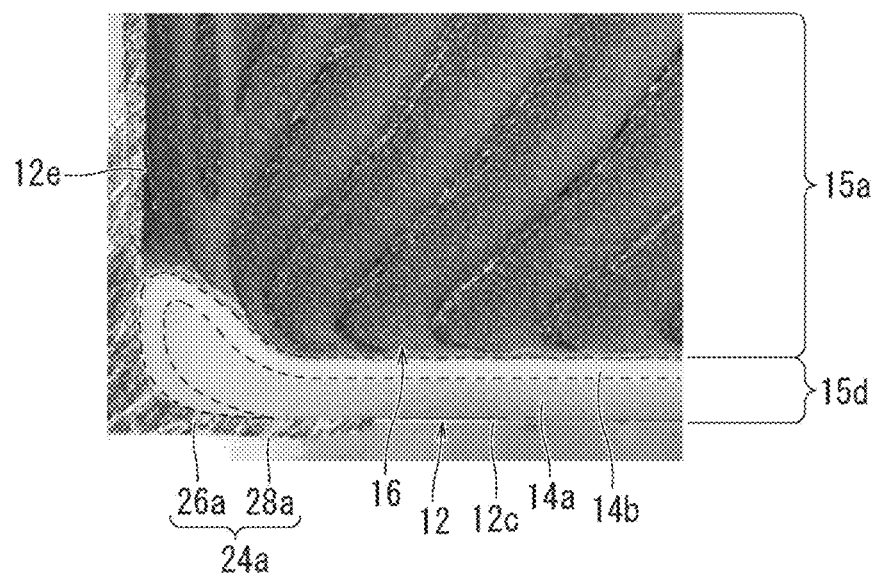
FIG. 8 shows an enlarged photograph of a cross section taken along line of FIG. 1 and showing a multilayer ceramic capacitor according to a preferred embodiment of the present invention.

FIG. 8 shows a partial enlarged photograph of first side surface side outer layer portion 15d and inner layer portion 15a of multilayer body 12 at an LW cross section. With reference to FIG. 8, first dielectric region 14a is located on the first side surface 12c side of first side surface side outer layer portion 15d, and second dielectric region 14b is located on the inner layer portion 15a side of first side surface side outer layer portion 15d and on each of the respective ridgeline portion sides on which first side surface 12c at first side surface side outer layer portion 15d crosses first end surface 12e and second end surface 12f. Thus, even if a crack is generated in multilayer body 12, it is possible to reduce or prevent progress of the crack, to reduce or prevent entry of moisture from the interface between outer electrode 24 and multilayer body 12, and to improve the impact resistance at the corner portion of multilayer ceramic capacitor 10. Moreover, in FIG. 8, first dielectric region 14a is not provided in a range surrounded by second dielectric region 14b at first side surface side outer layer portion 15d, first end surface 12e, and the metal of inner electrode layer 16. However, even if first dielectric region 14a is provided in the range surrounded by second dielectric region 14b at first side surface side outer layer portion 15d, first end surface 12e, and the metal of inner electrode layer 16, first dielectric region 14a is located on the first side surface 12c side of first side surface side outer layer portion 15d, and second dielectric region 14b is located on the inner layer portion 15a side of first side surface side outer layer portion 15d and on each of the respective ridgeline portion sides on which first side surface 12c at first side surface side outer layer portion 15d crosses first end surface 12e and second end surface 12f. Thus, even if a crack is generated in multilayer body 12, it is possible to reduce or prevent progress of the crack, to reduce or prevent entry of moisture from the interface between outer electrode 24 and multilayer body 12, and to improve the impact resistance at the corner portion of multilayer ceramic capacitor 10. Here, the width of first drawn electrode portion 20a of inner electrode layer 16 shown in FIG. 8 is narrowed.

Also in the case of second side surface side outer layer portion 15e, as with the content shown in FIG. 8, even when first dielectric region 14a is also provided in a range surrounded by second dielectric region 14b at second side surface side outer layer portion 15e, first end surface 12e, and the metal of inner electrode layer 16, first dielectric region 14a is located on the second side surface 12d side of second side surface side outer layer portion 15e, and second dielectric region 14b is located on the inner layer portion 15a side of second side surface side outer layer portion 15e and on each of the respective ridgeline portion sides on which second side surface 12d at second side surface side outer layer portion 15e crosses first end surface 12e and second end surface 12f. Thus, even if a crack is generated in multilayer body 12, it is possible to reduce or prevent progress of the crack, to reduce or prevent entry of moisture from the interface between outer electrode 24 and multilayer body 12, and to improve the impact resistance at the corner portion of multilayer ceramic capacitor 10.

Figure 9:
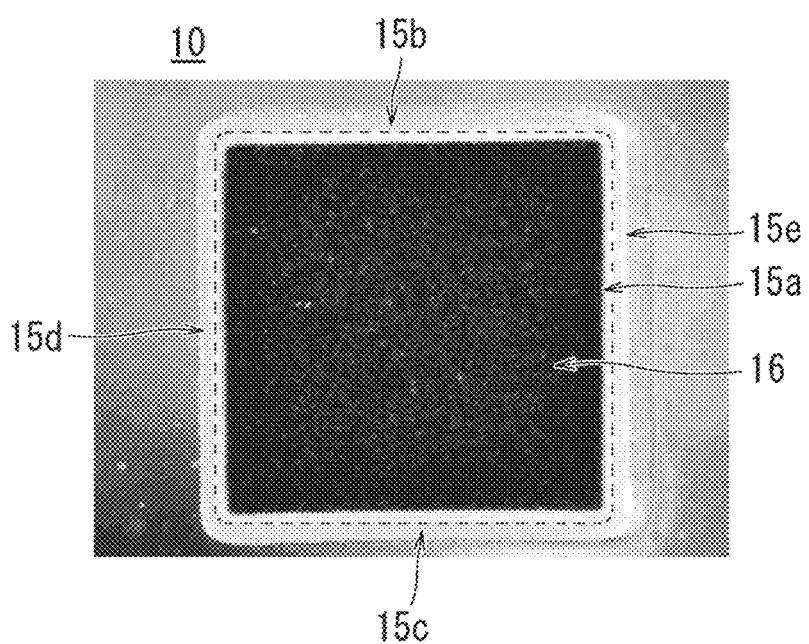
FIG. 9 shows an enlarged photograph of a cross section taken along line IV-IV of FIG. 1 and showing a multilayer ceramic capacitor according to a preferred embodiment of the present invention.

FIG. 9 shows a partial enlarged photograph of first main surface side outer layer portion 15b, second main surface side outer layer portion 15c, first side surface side outer layer portion 15d, second side surface side outer layer portion 15e, and inner layer portion 15a of multilayer body 12 at a WT cross section. With reference to FIG. 9, it is understood that at the WT cross section, second dielectric layer 14b is located on the inner layer portion 15a side at each of first main surface side outer layer portion 15b, second main surface side outer layer portion 15c, first side surface side outer layer portion 15d, and second side surface side outer layer portion 15e.

Although the number of dielectric layers 14 is not particularly limited, it is preferable to provide, for example, more than or equal to 10 and less than or equal to 1000 dielectric layers 14 inclusive of the outer layers.

Examples of a ceramic material usable herein include a dielectric ceramic mainly including $BaTiO_3$, $CaTiO_3$, $SrTiO_3$, $CaZrO_3$, or the like. Moreover, an accessory component such as a Mn compound, a Fe compound, a Cr compound, a Co compound, or a Ni compound may be added to each of these main components.

In addition, it is possible to use, for example, a piezoelectric ceramic such as a PZT-based ceramic, a semiconductor ceramic such as a spinel-based ceramic, or a magnetic ceramic such as ferrite. Moreover, when the piezoelectric ceramic is used, the multilayer ceramic electronic component defines and functions as a piezoelectric component. When the semiconductor ceramic is used, the multilayer ceramic electronic component defines and functions as a thermistor. When the magnetic ceramic is used, the multilayer ceramic electronic component defines and functions as an inductor. In the case of the inductor, inner electrode layer 16 is a conductor defining a coil.

The thickness of dielectric layer 14 is preferably, but not particularly limited to, for example, more than or equal to about 0.7 μm and less than or equal to about 30.0 μm.

As shown in FIG. 2A to FIG. 4, multilayer body 12 includes first main surface side outer layer portion 15b, second main surface side outer layer portion 15c, first side surface side outer layer portion 15d, and second side surface side outer layer portion 15e, which are defined by the plurality of dielectric layers 14. Also, multilayer body 12 includes inner layer portion 15a, which is defined by the plurality of dielectric layers 14 and the plurality of inner electrode layers 16. First main surface side outer layer portion 15b and second main surface side outer layer portion 15c are located on the respective main surface sides of multilayer body 12. Dielectric layer 14 is located between each main surface and inner electrode layer 16 closest to the main surface. First side surface side outer layer portion 15d and second side surface side outer layer portion 15e are located on the respective side surface sides of multilayer body 12. Dielectric layer 14 is located between each side surface and inner electrode layer 16 closest to the side surface. Inner layer portion 15a is a region surrounded by first main surface side outer layer portion 15b, second main surface side outer layer portion 15c, first side surface side outer layer portion 15d, and second side surface side outer layer portion 15e.

Each of the thicknesses of first main surface side outer layer portion 15b, second main surface side outer layer portion 15c, first side surface side outer layer portion 15d, and second side surface side outer layer portion 15e is preferably, for example, more than or equal to about 50 μm and less than or equal to about 400 μm.

The size of the multilayer body is not particularly limited. The size thereof in length direction z is preferably, for example, more than or equal to about 0.2 mm and less than or equal to about 7 mm. The size thereof in width direction y is preferably, for example, more than or equal to about 0.1 mm and less than or equal to about 6 mm. The size thereof in lamination direction x is preferably, for example, more than or equal to about 0.1 mm and less than or equal to about 3 mm.

Inner Electrode Layer

As shown in FIG. 2A and FIG. 4, the plurality of laminated inner electrode layers 16 include a plurality of first inner electrode layers 16a and a plurality of second inner electrode layers 16b.

As shown in FIG. 2A and FIG. 4, first inner electrode layers 16a include first facing electrode portions 18a facing second inner electrode layers 16b, and first drawn electrode portions 20a each located on one end side of first inner electrode layer 16a and extending from first facing electrode portion 18a to first end surface 12e of multilayer body 12. Each of first drawn electrode portions 20a includes an exposed end portion drawn to first end surface 12e.

As shown in FIG. 2A and FIG. 4, second inner electrode layers 16b include second facing electrode portions 18b facing first inner electrode layers 16a, and second drawn electrode portions 20b each located on one end side of second inner electrode layer 16b and extending from second facing electrode portion 18b to second end surface 12f of multilayer body 12. Each of second drawn electrode portions 20b includes an exposed end portion drawn to second end surface 12f.

Each of facing electrode portion 18a of first inner electrode layer 16a on one side and facing electrode portion 18b of second inner electrode layer 16b on the other side preferably has, but not particularly limited to, a rectangular or substantially rectangular shape, for example. It should be noted that the corner portion may be rounded or may be oblique (tapered).

Each of first drawn electrode portion 20a of first inner electrode layer 16a and second drawn electrode portion 20b of second inner electrode layer 16b preferably has, but not particularly limited to, a rectangular or substantially rectangular shape, for example. It should be noted that the corner portion may be rounded or may be oblique (tapered). The width of first facing electrode portion 18a of first inner electrode layer 16a and the width of first drawn electrode portion 20a of first inner electrode layer 16a may be the same or one of the widths may be narrower than the other. Similarly, the width of second facing electrode portion 18b of second inner electrode layer 16b and the width of second drawn electrode portion 20b of second inner electrode layer 16b may be the same or one of the widths may be narrower than the other.

Figure 10A:
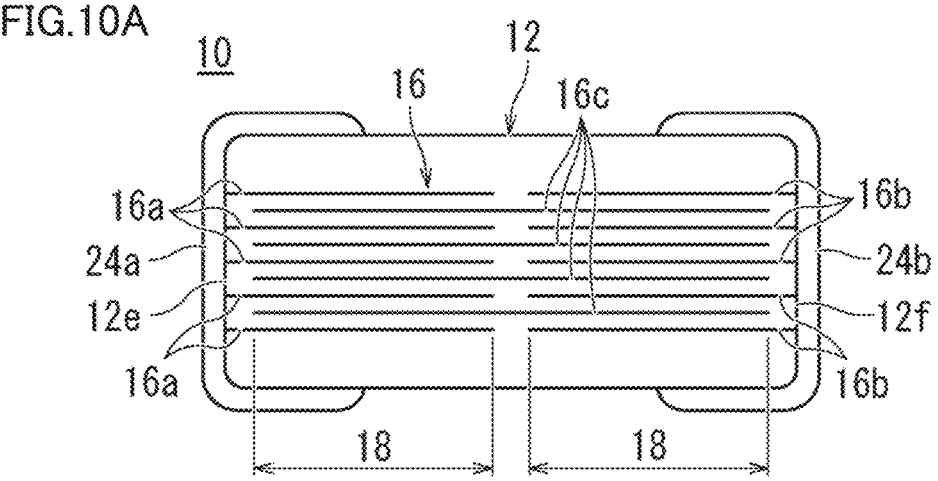
FIG. 10A is a cross sectional view taken along line II-II of FIG. 1 and showing a structure in which a facing electrode portion of the inner electrode layer of a multilayer ceramic capacitor according to a preferred embodiment of the present invention is divided into two.
Figure 10B:
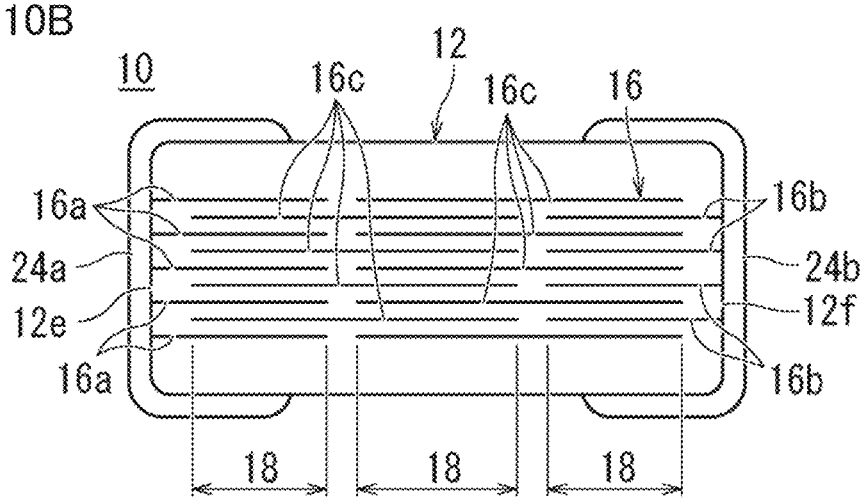
FIG. 10B is a cross sectional view taken along line II-II of FIG. 1 and showing a structure in which the facing electrode portion of the inner electrode layer of a multilayer ceramic capacitor according to a preferred embodiment of the present invention is divided into three.
Figure 10C:
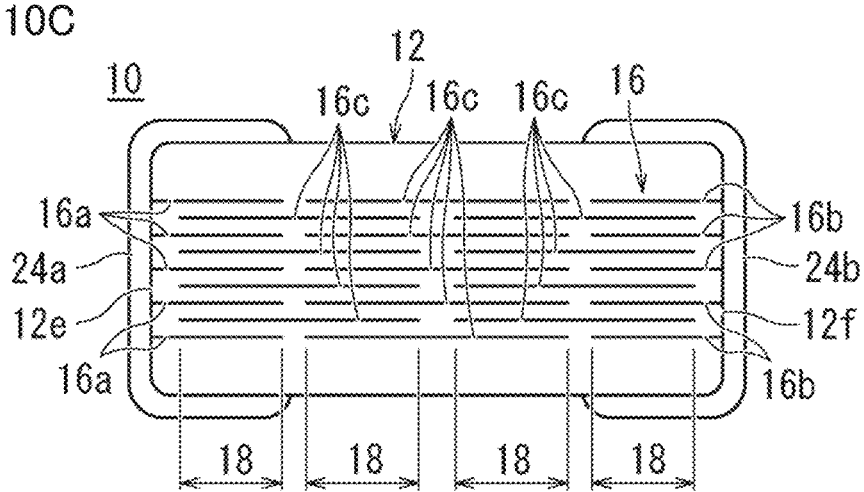
FIG. 10C is a cross sectional view taken along line II-II of FIG. 1 and showing a structure in which the facing electrode portion of the inner electrode layer of a multilayer ceramic capacitor according to a preferred embodiment of the present invention is divided into four.

It should be noted that when the ceramic electronic component is a capacitor, as inner electrode layers 16, floating inner electrode layers 16c not drawn to each of first end surface 12e and second end surface 12f may be provided in addition to first inner electrode layers 16a and second inner electrode layers 16b as shown in FIGS. 10A to 10C, thus obtaining a structure in which facing electrode portion 18 is divided into a plurality of facing electrode portions 18 by floating inner electrode layers 16c. Examples of the structure include a 2-stage structure as shown in FIG. 10A, a 3-stage structure as shown in FIG. 10B, a 4-stage structure as shown in FIG. 10C, and 4-or-more-stage structure. By obtaining the structure in which facing electrode portion 18 is divided into the plurality of facing electrode portions 18 in this way, the following configuration is obtained: a plurality of capacitor components are provided among inner electrode layers 16a, 16b, 16c facing one another and these capacitor components are connected in series. Accordingly, a voltage applied to each capacitor component becomes low, and the multilayer ceramic capacitor can have a high breakdown voltage.

Each of first inner electrode layer 16a and second inner electrode layer 16b can be made of an appropriate electrically conductive material. Examples of the appropriate electrically conductive material include a metal such as Ni, Cu, Ag, Pd, or Au; and an alloy including at least one of these metals such as an Ag—Pd alloy.

In multilayer body 12, first facing electrode portion 18a of first inner electrode layer 16a and second facing electrode portion 18b of second inner electrode layer 16b face each other with dielectric layer 14 interposed therebetween, thus providing a capacitance. Therefore, a capacitance can be obtained between first outer electrode 24a to which first inner electrode layer 16a is connected and second outer electrode 24b to which second inner electrode layer 16b is connected, thus having a characteristic of a capacitor.

The thickness of each of first inner electrode layer 16a and second inner electrode layer 16b is preferably more than or equal to about 0.2 μm and less than or equal to about 2.0 μm, for example.

The number of inner electrode layers 16 is preferably, but not particularly limited to, more than or equal to 5 and less than or equal to 500, for example.

Outer Electrode Layer

Outer electrode 24 includes a first outer electrode 24a and a second outer electrode 24b as shown in FIG. 2A.

First outer electrode 24a is located on first end surface 12e as shown in FIG. 1.

Second outer electrode 24b is located on second end surface 12f as shown in FIG. 1.

It should be noted that each of first outer electrode 24a and second outer electrode 24b preferably extends to a portion on first main surface 12a, a portion on second main surface 12b, a portion on first side surface 12c, and a portion on second side surface 12d. Each of first outer electrode 24a and second outer electrode 24b preferably extends to at least a portion on second main surface 12b located on the mounting surface side and a portion on second main surface 12b.

As shown in FIG. 2A, first outer electrode 24a is connected to first drawn electrode portion 20a and is therefore connected to first inner electrode layer 16a.

As shown in FIG. 2A, second outer electrode 24b is connected to second drawn electrode portion 20b and is therefore connected to second inner electrode layer 16b.

Each of first outer electrode 24a and second outer electrode 24b preferably includes, for example, underlying electrode layer 26 and a plating layer 28 as shown in FIG. 2A.

As shown in FIG. 2A, first outer electrode 24a includes a first underlying electrode layer 26a and a first plating layer 28a in this order from the multilayer body 12 side. First plating layer 28a is disposed on a surface of first underlying electrode layer 26a. Similarly, second outer electrode 24b includes a second underlying electrode layer 26b and a second plating layer 28b in this order from the multilayer body 12 side. Second plating layer 28b is disposed on a surface of second underlying electrode layer 26b.

As shown in FIG. 2A, first underlying electrode layer 26a is disposed on the surface of first end surface 12e of multilayer body 12, and extends from first end surface 12e so as to cover respective portions of first main surface 12a, second main surface 12b, first side surface 12c, and second side surface 12d.

As shown in FIG. 2A, second underlying electrode layer 26b is disposed on the surface of second end surface 12f of multilayer body 12, and extends from second end surface 12f so as to cover respective portions of first main surface 12a, second main surface 12b, first side surface 12c, and second side surface 12d.

It should be noted that first underlying electrode layer 26a may be disposed only on the surface of first end surface 12e of multilayer body 12, and second underlying electrode layer 26b may be disposed only on the surface of second end surface 12f of multilayer body 12.

Each of first underlying electrode layer 26a and second underlying electrode layer 26b (hereinafter, also simply referred to as "underlying electrode layer 26") includes at least one selected from a baked layer, a conductive resin layer, a thin film layer, and the like.

First, the following describes that each of first underlying electrode layer 26a and second underlying electrode layer 26b of underlying electrode layers 26 is a baked layer.

A plurality of baked layers may be provided.

The baked layer includes glass and a metal. Examples of the metal of the baked layer include at least one selected from Cu, Ni, Ag, Pd, an Ag—Pd alloy, Au, and the like. Moreover, the glass of the baked layer includes at least one selected from B, Si, Ba, Mg, Al, Li, and the like. A plurality of baked layers may be provided. The baked layer is obtained by applying, to multilayer body 12, a conductive paste including the glass and the metal and baking it. The baked layer may be calcined together with dielectric layer 14 and inner electrode layer 16, or the baking may be performed after calcining dielectric layer 14 and inner electrode layer 16.

The thickness of the baked layer at each of the central portion of first underlying electrode layer 26a located on first end surface 12e in the height direction and the central portion of second underlying electrode layer 26b located on second end surface 12f in the height direction is preferably more than or equal to about 10 μm and less than or equal to about 200 μm, for example.

Moreover, when underlying electrode layers 26 are provided on the surfaces of first main surface 12a, second main surface 12b, first side surface 12c, and second side surface 12d, the thickness of the baked layer at each of the central portions of first underlying electrode layer 26a and second underlying electrode layer 26b located on the surfaces of first main surface 12a, second main surface 12b, first side surface 12c and second side surface 12d in the length direction is preferably more than or equal to about 5 μm and less than or equal to about 50 μm, for example.

The resin layer may include a resin layer including conductive particles and a thermosetting resin. The resin layer may be provided directly on multilayer body 12 without providing a baked electrode layer.

Next, the following describes that each of first underlying electrode layer 26a and second underlying electrode layer 26b of underlying electrode layers 26 is a conductive resin layer.

A plurality of conductive resin layers may be provided.

The conductive resin layer may be disposed on the surface of the baked layer so as to cover the baked layer, or may be disposed directly on the surface of multilayer body 12.

The thickness of the conductive resin layer at each of the central portion of first underlying electrode layer 26a located on first end surface 12e in the height direction and second underlying electrode layer 26b located on second end surface 12f in the height direction is preferably more than or equal to about 10 μm and less than or equal to about 200 μm, for example.

Moreover, when underlying electrode layers 26 are provided on the surfaces of first main surface 12a, second main surface 12b, first side surface 12c and second side surface 12d, the thickness of the conductive resin layer at each of the central portions of first underlying electrode layer 26a and second underlying electrode layer 26b located on the surfaces of first main surface 12a, second main surface 12b, first side surface 12c and second side surface 12d in the length direction is preferably more than or equal to about 5 μm and less than or equal to about 50 μm, for example.

The conductive resin layer includes a thermosetting resin and a metal. The conductive resin layer thus including the thermosetting resin has more flexibility than a conductive layer made of a plating film or a calcined conductive paste, for example. Accordingly, even when a physical impact or an impact resulting from heat cycle is applied to the multilayer ceramic capacitor, the conductive resin layer defines and functions as a buffer layer, thus preventing a crack in the multilayer ceramic capacitor.

As the metal included in the conductive resin layer, Ag, Cu, or an alloy thereof can be used, for example. Moreover, metal powder having a surface coated with Ag can be used. When the metal powder having a surface coated with Ag is used, it is preferable to use, for example, Cu or Ni as the metal powder. Moreover, Cu having been through an oxidation prevention process can also be used. Particularly, it is preferable to use the conductive metal powder with Ag as the metal included in the conductive resin layer, due to the following reasons. Ag has the lowest specific resistance among the metals and is therefore suitable for an electrode material, and Ag is a noble metal and is therefore not oxidized, and has a high weather resistance. It should be noted that it is preferable to use the metal coated with Ag as the metal included in the conductive resin layer, due to the following reason. An inexpensive metal can be used for the base material while maintaining the characteristics of Ag.

For example, more than or equal to about 35 vol % and less than or equal to about 75 vol % of the metal included in the conductive resin layer is preferably included with respect to the volume of the entire conductive resin.

The shape of the metal (electrically conductive filler) included in the conductive resin layer is not particularly limited. For the electrically conductive filler, spherical metal powder, flat metal powder, or the like can be used. However, it is preferable to mix and use the spherical metal powder and the flat metal powder.

The average particle size of the metal (electrically conductive filler) included in the conductive resin layer is not particularly limited. The average particle size of the electrically conductive filler may preferably be more than or equal to about 0.3 μm and less than or equal to about 10 μm, for example.

The metal (electrically conductive filler) included in the conductive resin layer is mainly responsible for electrical conductivity of the conductive resin layer. Specifically, an electrical path is provided in the conductive resin layer due to the particles of the electrically conductive filler being in contact with each other.

Examples of the resin of the conductive resin layer usable herein include various known thermosetting resins such as an epoxy resin, a phenol resin, an urethane resin, a silicone resin, or a polyimide resin. Among them, the epoxy resin, which has excellent heat resistance, moisture resistance, adhesion, and the like, is one of the most preferable resins.

For example, more than or equal to about 25 vol % and less than or equal to about 65 vol % of the resin included in the conductive resin layer is preferably included with respect to the volume of the entire conductive resin.

Moreover, it is preferable to include not only the thermosetting resin but also a curing agent in the conductive resin layer. When the epoxy resin is used as a base resin, examples of the curing agent for the epoxy resin usable herein include various known compounds such as a phenol resin, an amine-based curing agent, an acid anhydride-based curing agent, and an imidazole-based curing agent.

Moreover, when underlying electrode layer 26 is a thin film layer, the thin film layer is formed by a thin film forming method such as a sputtering method or a vapor deposition method, for example. The thin film layer is preferably a layer of less than or equal to about 1 μm with the metal particles being deposited.

Plating layer 28 includes first plating layer 28a and second plating layer 28b.

First plating layer 28a is disposed to cover first underlying electrode layer 26a. Specifically, first plating layer 28a is preferably disposed on the surface of first underlying electrode layer 26a at first end surface 12e so as to extend to the surface of first underlying electrode layer 26a at first main surface 12a, second main surface 12b, first side surface 12c, and second side surface 12d. It should be noted that first plating layer 28a may be disposed only on the surface of first underlying electrode layer 26a disposed on first end surface 12e.

Second plating layer 28b is disposed to cover second underlying electrode layer 26b. Specifically, second plating layer 28*b* is preferably disposed on the surface of second underlying electrode layer 26*b* at second end surface 12*f* so as to extend to the surface of second underlying electrode layer 26*b* at first main surface 12*a*, second main surface 12*b*, first side surface 12*c*, and second side surface 12*d*. It should be noted that second plating layer 28*b* may be disposed only on the surface of second underlying electrode layer 26*b* disposed on second end surface 12*f*.

Moreover, examples of each of first plating layer 28*a* and second plating layer 28*b* (hereinafter, simply referred to as "plating layer 28") include at least one selected from Cu, Ni, Sn, Ag, Pd, an Ag—Pd alloy, Au, and the like.

Plating layer 28 may include a plurality of layers. In this case, plating layer 28 preferably has a two-layer structure including a Ni plating layer and a Sn plating layer, for example. Since the Ni plating layer is provided to cover the surface of underlying electrode layer 26, underlying electrode layer 26 can be prevented from being eroded by a solder used when mounting multilayer ceramic capacitor 10. Moreover, by providing a Sn plating layer on the surface of the Ni plating layer, wettability of the solder used is improved when mounting multilayer ceramic capacitor 10, thus facilitating the mounting.

The thickness of one plating layer is preferably more than or equal to about 2 μm and less than or equal to about 15 μm, for example.

It should be noted that outer electrode 24 may include only of plating layer 28 without providing underlying electrode layer 26. The following describes a structure in which plating layer 28 is provided without providing underlying electrode layer 26.

On each of first outer electrode 24*a* and second outer electrode 24*b*, no underlying electrode layer 26 may be provided, and plating layer 28 may be directly provided on the surface of multilayer body 12. That is, multilayer ceramic capacitor 10 may have a structure including plating layer 28 electrically connected to first inner electrode layer 16*a* or second inner electrode layer 16*b*. In such a case, plating layer 28 may be provided after providing a catalyst on the surface of multilayer body 12 as a pre-process.

The plating layer preferably includes a lower plating electrode provided on the surface of multilayer body 12, and an upper plating electrode provided on a surface of the lower plating electrode.

Each of the lower plating electrode and the upper plating electrode preferably includes at least one metal selected from Cu, Ni, Sn, Pb, Au, Ag, Pd, Bi, Zn and the like, or preferably includes an alloy including the metal(s), for example.

The lower plating electrode is preferably made of Ni having a solder barrier characteristic, whereas the upper plating electrode is preferably made of Sn or Au having an excellent solder wettability, for example. Moreover, for example, when each of first inner electrode layer 16*a* and second inner electrode layer 16*b* is made of Ni, the lower plating electrode is preferably made of Cu having excellent bondability with Ni. It should be noted that the upper plating electrode may be provided as required. Each of first outer electrode 24*a* and second outer electrode 24*b* may include only the lower plating electrode.

In plating layer 28, the upper plating electrode may be the outermost layer, or another plating electrode may be further provided on the surface of the upper plating electrode.

The thickness of one plating layer disposed with no underlying electrode layer being provided is preferably more than or equal to about 1 μm and less than or equal to about 15 μm, for example. It is preferable for the plating layer not to include glass. A ratio of metal per unit volume of plating layer 28 is preferably more than or equal to about 99 vol %, for example.

It is assumed that an L size represents the size, in length direction z, of multilayer ceramic capacitor 10 including multilayer body 12, first outer electrode 24*a*, and second outer electrode 24*b*, a T size represents the size, in lamination direction x, of multilayer ceramic capacitor 10 including multilayer body 12, first outer electrode 24*a*, and second outer electrode 24*b*, and a W size represents the size, in width direction y, of multilayer ceramic capacitor 10 including multilayer body 12, first outer electrode 24*a*, and second outer electrode 24*b*.

The L size of multilayer ceramic capacitor 10 in length direction z is preferably more than or equal to about 0.2 mm and less than or equal to about 7 mm, for example. The T size thereof in lamination direction x is preferably more than or equal to about 0.1 mm and less than or equal to about 6 mm, for example. The W size thereof in width direction y is preferably more than or equal to about 0.1 mm and less than or equal to about 3 mm, for example.

Method for Manufacturing Multilayer Ceramic Capacitor

Next, the following describes a non-limiting example of a method for manufacturing multilayer ceramic capacitor 10 according to a preferred embodiment of the present invention.

First, a dielectric sheet and a conductive paste for an inner electrode are prepared. A binder and a solvent are included in each of the dielectric sheet and the conductive paste for an inner electrode. A known organic binder and an organic solvent can be used.

Here, in order to obtain small grain sizes (in order to reduce or prevent grain growth) in dielectric layer 14 located on the inner layer portion 15*a* side of each of first main surface side outer layer portion 15*b* and second main surface side outer layer portion 15*c* or first side surface side outer layer portion 15*d* and second side surface side outer layer portion 15*e*, a dielectric sheet is used including large amounts of rare earth metals for the corresponding portions of first main surface side outer layer portion 15*b* and second main surface side outer layer portion 15*c* or first side surface side outer layer portion 15*d* and second side surface side outer layer portion 15*e*. Since each of the rare earth metals included in dielectric layer 14, such as Mg and Dy, for example, reduces or prevents grain growth, the dielectric sheet is designed such that a large amount of the rare earth metal is disposed around a portion in which grain growth is to be reduced or prevented. The content of the rare earth metal is preferably about twice as large as the content of the rare earth metal included in a dielectric sheet for forming a portion in which grain sizes are not to be made small. It should be noted that by using Ni for the metal included in inner electrode layer 16, grain growth can be further reduced or prevented, thus facilitating decrease in grain sizes in dielectric layer 14 located on the inner layer portion 15*a* side of each of first main surface side outer layer portion 15*b* and second main surface side outer layer portion 15*c* or first side surface side outer layer portion 15*d* and second side surface side outer layer portion 15*e*.

Moreover, also in order to obtain smaller grain sizes in dielectric layer 14 located along each of the respective ridgeline portion sides on which first main surface 12*a* of multilayer body 12 at first main surface side outer layer portion 15*b* crosses first end surface 12*e* and second end surface 12*f* and smaller grain sizes in dielectric layer 14 located along each of the respective ridgeline portion sides on which second main surface 12*b* of multilayer body 12 at second main surface side outer layer portion 15c crosses first end surface 12e and second end surface 12f than the grain sizes in dielectric layer 14 located on the first main surface 12a side of first main surface side outer layer portion 15b or the grain sizes in the dielectric layer located on the second main surface side of second main surface side outer layer portion 15c, a dielectric sheet having a high content of each of the rare earth metals to be included in dielectric layer 14 such as Mg and Dy, for example, is used for the dielectric sheet for each of the corresponding portions. The content of the rare earth metal included in the dielectric sheet for forming the portion along each of the respective ridgeline portion sides on which first main surface 12a of multilayer body 12 at first main surface side outer layer portion 15b crosses first end surface 12e and second end surface 12f and the portion (corner portion) along each of the respective ridgeline portion sides on which second main surface 12b of multilayer body 12 at second main surface side outer layer portion 15c crosses first end surface 12e and second end surface 12f is preferably about twice as large as the content of the rare earth metal included in the dielectric sheet for forming the portion in which the grain sizes are not to be made small. It should be noted that by using Ni for the metal included in the inner electrode layer, grain growth can be further reduced or prevented, thus facilitating decrease in the grain sizes in dielectric layer 14 located at each of the portion along each of the respective ridgeline portion sides on which first main surface 12a of multilayer body 12 at first main surface side outer layer portion 15b crosses first end surface 12e and second end surface 12f and the portion (corner portion) along each of the respective ridgeline portion sides on which second main surface 12b of multilayer body 12 at second main surface side outer layer portion 15c crosses first end surface 12e and second end surface 12f.

Next, an inner electrode pattern is formed on the dielectric sheet by printing the conductive paste for an inner electrode in a predetermined pattern by way of screen printing, gravure printing, or the like, for example.

Next, a lamination sheet is produced in the following manner. That is, a predetermined number of dielectric sheets used for outer layers and including no inner electrode pattern printed thereon are laminated. Dielectric sheets each including an inner electrode pattern printed thereon are laminated successively on the dielectric sheets for outer layers. Further, a predetermined number of dielectric sheets used for outer layers and including no inner electrode pattern printed thereon are laminated.

The lamination sheets are pressed in the lamination direction by, for example, hydrostatic pressure press or the like, thus producing a lamination block.

Then, the lamination block is cut into predetermined shape and size, thus cutting out a raw multilayer body chip. On this occasion, barrel polishing or the like, for example, may be provided to the raw multilayer body chip so as to obtain rounded corner portions and ridgeline portions in multilayer body 12.

Thereafter, the lamination chip is calcined to produce multilayer body 12. Although the calcination temperature depends on a material of dielectric layer 14 or inner electrode layer 16, the calcination temperature is preferably more than or equal to about 900° C. and less than or equal to about 1300° C., for example.

Finally, underlying electrode layer 26 is formed by applying, onto each of the end surfaces of multilayer body 12, the conductive paste defining the underlying electrode. In the present preferred embodiment of the present invention, the baked layer is formed as underlying electrode layer 26.

When the baked layer is formed, a conductive paste including a glass component and a metal is applied by, for example, a method such as dipping, and then a baking process is performed, thus forming underlying electrode layer 26. The temperature of the baking process on this occasion is preferably more than or equal to about 700° C. and less than or equal to about 900° C., for example.

It should be noted that when underlying electrode layer 26 is defined by the conductive resin layer, the conductive resin layer can be formed by the following methods. It should be noted that the conductive resin layer may be formed on the surface of the baked layer, or the conductive resin layer may be solely formed directly on multilayer body 12 without forming the baked layer. As a method for forming the conductive resin layer, the conductive resin layer is formed in the following manner. That is, a conductive resin paste including a thermosetting resin and a metal component is applied onto the baked layer or multilayer body 12, and heat treatment is performed at a temperature of, for example, more than or equal to about 250° C. and less than or equal to about 550° C. to thermally cure the resin. An atmosphere during the heat treatment on this occasion is preferably a $N_2$ atmosphere, for example. Moreover, in order to prevent scattering of the resin and prevent oxidation of various metal components, an oxygen concentration is preferably reduced or prevented to be less than or equal to about 100 ppm, for example.

Moreover, when underlying electrode layer 26 is defined by a thin film layer, underlying electrode layer 26 can be formed by a thin film forming method such as a sputtering method or a vapor deposition method, for example. Underlying electrode layer 26 defined by the thin film layer is preferably a layer of less than or equal to about 1 μm, for example, with metal particles being deposited therein.

Further, plating layer 28 may be provided on an exposed portion of inner electrode layer 16 of multilayer body 12 without providing underlying electrode layer 26. In that case, plating layer 28 can be formed by the following method.

A plating process is performed onto first end surface 12e and second end surface 12f of multilayer body 12 to form an underlying plating film on the exposed portion of inner electrode layer 16. For the plating process, either of electrolysis plating and non-electrolytic plating may be used. However, the non-electrolytic plating requires a pre-process using a catalyst or the like in order to improve a plating deposition rate, thus resulting in complicated steps. Therefore, normally, it is preferable to use the electrolysis plating. As the plating method, it is preferable to use barrel plating. Moreover, the upper plating electrode may be formed on the surface of the lower layer plating electrode in a similar manner as required.

Then, plating layer 28 is formed on each of the surface of underlying electrode layer 16, the surface of the conductive resin layer or the surface of the underlying plating layer, and the surface of the upper plating layer. In the present preferred embodiment, for example, a Ni plating layer and a Sn plating layer are formed on the baked layer. The Ni plating layer and the Sn plating layer are formed sequentially by the barrel plating method, for example. In this way, multilayer ceramic capacitor 10 is obtained.

Experiment Examples

In accordance with the above-described manufacturing method, a multilayer ceramic capacitor was produced as a multilayer ceramic electronic component, and was checked through impact resistance test and moisture resistance load test on a corner portion thereof.

Specification of Ceramic Capacitor Used for Example
- Size L×W×T (designed value): about 3.310 mm×about 2.645 mm×about 2.645 mm
- Ceramic material: $BaTiO_3$
- Capacitance: about 10 μF
- Rated voltage: about 100 V Information on Outer Layer Portions Dy and Mg were included in a dielectric sheet at a portion corresponding to a portion of the dielectric layer in which grain sizes are to be made small (portion thereof in which grain growth is to be reduced or prevented). It should be noted that an amount of Dy contained therein was about 20 times as large as an amount of Mg in a molar ratio.

In the dielectric sheet for the region of the dielectric layer in which grain sizes are to be made small, Dy and Mg were included 2.5 times as large as those in the dielectric sheet for forming the region of the dielectric layer in which the grain sizes are not to be made small.

The grain sizes at the outer layer portions were adjusted as follows.

At first main surface side outer layer portion 15b, the grain sizes in dielectric layer 14 located on the inner layer portion 15a side of first main surface side outer layer portion 15b are smaller than the grain sizes in dielectric layer 14 located on the first main surface 12a side of first main surface side outer layer portion 15b.

At second main surface side outer layer portion 15c, the grain sizes in dielectric layer 14 located on the inner layer portion 15a side of second main surface side outer layer portion 15c are smaller than the grain sizes in dielectric layer 14 located on the second main surface 12b side of second main surface side outer layer portion 15c.

The grain sizes in dielectric layer 14 located along each of the respective ridgeline portion sides on which first main surface 12a of multilayer body 12 at first main surface side outer layer portion 15b crosses first end surface 12e and second end surface 12f are smaller than the grain sizes in dielectric layer 14 located on the first main surface 12a side of first main surface side outer layer portion 15b.

The grain sizes in dielectric layer 14 located along each of the respective ridgeline portion sides on which second main surface 12b of multilayer body 12 at second main surface side outer layer portion 15c crosses first end surface 12e and second end surface 12f are less than the grain sizes in dielectric layer located on the second main surface 12b side of second main surface side outer layer portion 15c.

Specifically, the grain sizes were as follows.

Each of the grain sizes in dielectric layer 14 located on the inner layer portion 15a side of first main surface side outer layer portion 15b and the grain sizes in dielectric layer 14 located on the inner layer portion 15a side of second main surface side outer layer portion 15c was more than or equal to about 0.1 μm and less than or equal to about 0.5 μm.

Each of the grain sizes in dielectric layer 14 located on the first main surface 12a side of first main surface side outer layer portion 15b and the grain sizes in dielectric layer 14 located on the second main surface 12b side of second main surface side outer layer portion 15c was more than or equal to about 1 μm and less than or equal to about 5 μm.

Each of the grain sizes in dielectric layer 14 located along each of the respective ridgeline portion sides on which first main surface 12a of multilayer body 12 at first main surface side outer layer portion 15b crosses first end surface 12e and second end surface 12f was more than or equal to about 0.1 μm and less than or equal to about 0.5 μm.

Each of the grain sizes in dielectric layer 14 located along each of the respective ridgeline portion sides on which second main surface 12b of multilayer body 12 at second main surface side outer layer portion 15c crosses first end surface 12e and second end surface 12f was more than or equal to about 0.1 μm and less than or equal to about 0.5 μm.

Structure of Outer Electrode

Underlying electrode layer: a sintered electrode layer including a conductive metal (Cu) and a glass component End-surface film thickness of the underlying electrode layer: about 121 μm Plating layer: two-layer structure with Ni plating layer+Sn plating layer Ni Plating Layer:

Thickness at the central portion in the height direction on each of first end surface 12e and second end surface 12f in a cross section of multilayer body 12 at the ½ W location: about 2.9 μm Thickness at the central portion in the length direction on each of first main surface 12a, second main surface 12b, first side surface 12c, and second side surface 12d in a cross section of multilayer body 12 at the ½ W location: about 2.9 μm (e-size plating thickness)

Sn Plating Layer:

Thickness at the central portion in the height direction on each of first end surface 12e and second end surface 12f in a cross section of multilayer body 12 at the ½ W location: about 4.2 μm Thickness at the central portion in the length direction on each of first main surface 12a, second main surface 12b, first side surface 12c, and second side surface 12d in a cross section of multilayer body 12 at the ½ W location: about 4.2 μm As a Comparative Example 1, a multilayer ceramic capacitor of the following specifications was prepared. In Comparative Example 1, the same ceramic dielectric layer was used for each of the first and second main surface side outer layer portions, the first and second side surface side outer layer portions, the first and second end surface side outer layer portions, and the inner layer portion.

Specification of Ceramic Capacitor Used for Comparative Example 1
- Size L×W×T (designed value): about 3.310 mm×about 2.645 mm×about 2.645 mm
- Ceramic Material: $BaTiO_3$
- Capacitance: about 10 μF
- Rated Voltage: about 100 V Information on Outer Layer Portions The grain sizes in dielectric layer 14 at any locations of the first main surface side outer layer portion and the second main surface side outer layer portion are the same.

The grain sizes in dielectric layer 14 at any locations of the first main surface side outer layer portion and the second main surface side outer layer portion were about more than or equal to about 0.1 μm and less than or equal to about 0.5 μm.

Structure of Outer Electrode

Underlying electrode layer: a sintered electrode layer including a conductive metal (Cu) and a glass component End-surface film thickness of the underlying electrode layer: about 121 μm Plating layer: two-layer structure with Ni plating layer+Sn plating layer Ni Plating Layer:

Thickness at the central portion in the height direction on each of first end surface 12e and second end surface 12f in a cross section of multilayer body 12 at the ½ W location: about 2.9 μm Thickness at the central portion in the length direction on each of first main surface 12a, second main surface 12b, first side surface 12c, and second side surface 12d in a cross section of multilayer body 12 at the ½ W location: about 2.9 µm (e-size plating thickness)

Sn Plating Layer:

Thickness at the central portion in the height direction on each of first end surface 12e and second end surface 12f in a cross section of multilayer body 12 at the ½ W location: about 4.2 µm Thickness at the central portion in the length direction on each of first main surface 12a, second main surface 12b, first side surface 12c, and second side surface 12d in a cross section of multilayer body 12 at the ½ W location: about 4.2 µm As a Comparative Example 2, a multilayer ceramic capacitor having the following specification was prepared. Comparative Example 2 presents a multilayer body having a two-layer structure in which grain sizes in a dielectric layer located on an inner layer portion side are smaller than grain sizes in a dielectric layer on each of the main surface side and the side surface side as in Japanese Patent Laying-Open No. 2015-226053.

Specification of Ceramic Capacitor Used for Comparative Example 2

Size L×W×T (designed value): about 3.310 mm×about 2.645 mm×about 2.645 mm

Ceramic material: $BaTiO_3$

Capacitance: about 10 µF

Rated voltage: about 100 V

Information on Outer Layer Portions

Dy and Mg were included in a dielectric sheet at a portion corresponding to a portion of the dielectric layer in which grain sizes are to be made small (portion thereof in which grain growth is to be reduced or prevented). It should be noted that an amount of Dy included therein was about 20 times as large as an amount of Mg in a molar ratio.

In a dielectric sheet for a region of dielectric layer in which grain sizes are to be made small, Dy and Mg were included in an amount about 2.5 times as large as those in the dielectric sheet for forming the region of dielectric layer 14 in which the grain sizes are not to be made small.

The grain sizes at the outer layer portions were adjusted as follows.

At the first main surface side outer layer portion, the grain sizes in the dielectric layer located on the inner layer portion side of the first main surface side outer layer portion are smaller than the grain sizes in the dielectric layer located on the first main surface side of the first main surface side outer layer portion.

At the second main surface side outer layer portion, the grain sizes in the dielectric layer located on the inner layer portion side of the second main surface side outer layer portion are smaller than the grain sizes in the dielectric layer located on the second main surface side of the second main surface side outer layer portion.

Specifically, the grain sizes were as follows.

Each of the grain sizes in the dielectric layer located on each of the inner layer portion side of the first main surface side outer layer portion and the inner layer portion side of the second main surface side outer layer portion was about more than or equal to about 0.1 µm and less than or equal to about 0.5 µm.

Each of the grain sizes in the dielectric layer located on each of the first main surface side of the first main surface side outer layer portion and the second main surface side of the second main surface side outer layer portion was about more than or equal to about 1 µm and less than or equal to about 5 µm.

Structure of Outer Electrode

Underlying electrode layer: a sintered electrode layer including a conductive metal (Cu) and a glass component End-surface film thickness of the underlying electrode layer: about 121 µm Plating layer: two-layer structure with Ni plating layer+Sn plating layer Ni Plating Layer:

Thickness at the central portion in the height direction on each of first end surface 12e and second end surface 12f in a cross section of multilayer body 12 at the ½ W location: about 2.9 µm Thickness at the central portion in the length direction on each of first main surface 12a, second main surface 12b, first side surface 12c, and second side surface 12d in a cross section of multilayer body 12 at the ½ W location: about 2.9 µm (e-size plating thickness)

Sn Plating Layer:

Thickness at the central portion in the height direction on each of first end surface 12e and second end surface 12f in a cross section of multilayer body 12 at the ½ W location: about 4.2 µm Thickness at the central portion in the length direction on each of first main surface 12a, second main surface 12b, first side surface 12c, and second side surface 12d in a cross section of multilayer body 12 at the ½ W location: about 4.2 µm Test Methods (a) Impact Resistance Test (Crack Check Test) on Corner Portion An impact resistance test (crack check test) on the corner portion was performed by pressing portions of the multilayer ceramic capacitors along the ridgeline portion sides on which the first main surfaces of the multilayer bodies at the first main surface side outer layer portions cross the first end surfaces and the second end surfaces, or portions (corner portions) of the multilayer ceramic capacitors along the ridgeline portion sides on which the second main surfaces of the multilayer bodies at the second main surface side outer layer portions cross the first end surfaces and the second end surfaces.

Figure 11A:
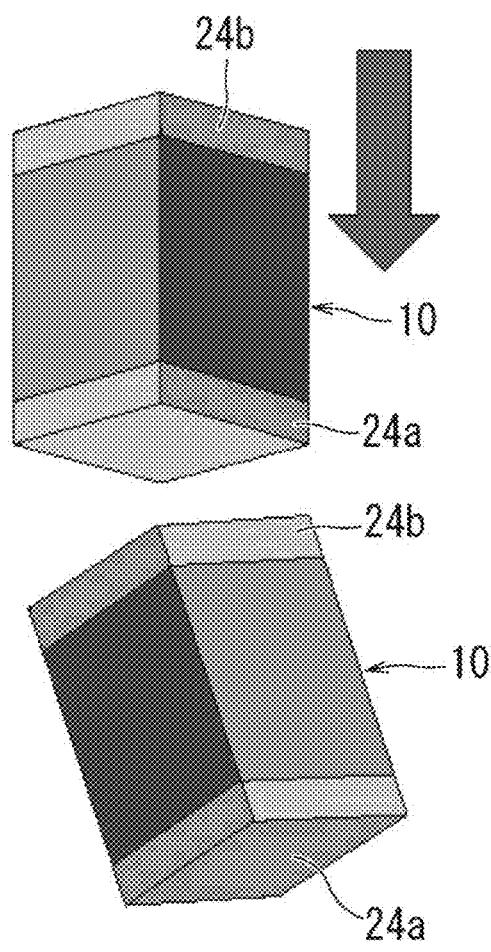
FIGS. 11A and 11B are explanatory diagrams showing a test state in an impact resistance test (crack check test) on a corner portion.
Figure 11B:
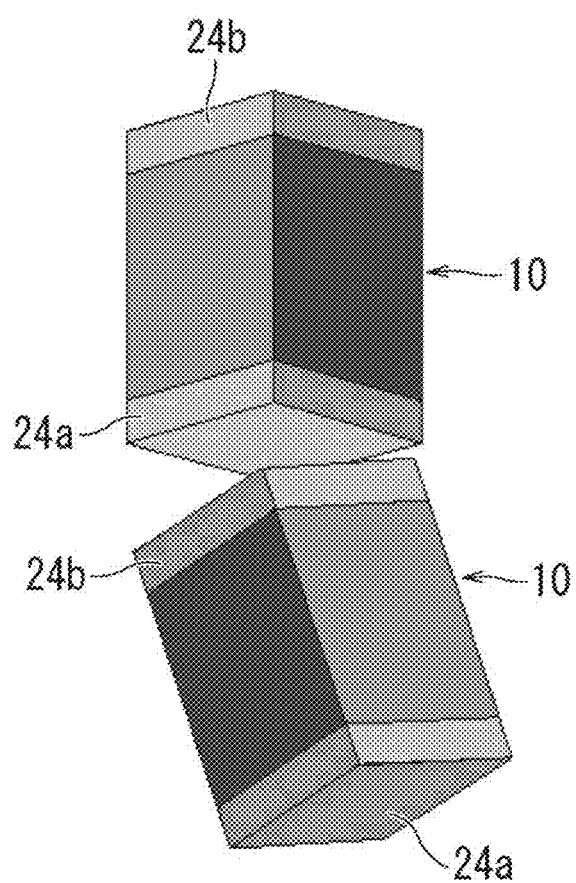

Specifically, as shown in FIGS. 11A and 11B, one multilayer ceramic capacitor 10 was fixed, and the other multilayer ceramic capacitor 10 was pressed thereagainst with certain force using a device capable of pressing with designated force. Multilayer ceramic capacitors 10 thus pressed were subjected to cross sectional polishing to expose the WT surfaces of multilayer ceramic capacitors 10 at the pressed portions. Next, in this polished cross section, a metallographic microscope was used to check whether or not cracks were generated at the portions of multilayer ceramic capacitors 10 along the ridgeline portion sides on which the first main surfaces of multilayer bodies 12 at the first main surface side outer layer portions cross the first end surfaces and the second end surfaces, or the portions (corner portions) of multilayer ceramic capacitors 10 along the ridgeline portion sides on which the second main surfaces of multilayer bodies 12 at the second main surface side outer layer portions cross the first end surfaces and the second end surfaces. A multilayer body checked to have a crack generated therein was regarded as "failed". Moreover, force for pressing the corner portions of the multilayer bodies was set to about 25 N.

(b) Moisture Resistance Load Test

The moisture resistance load test was performed to measure an insulation resistance value. When deterioration with an insulation resistance value of about $1.0 \times 10^6$ (Ω) occurred, it was determined as "failed".

Specifically, the multilayer ceramic capacitor was placed in a tub of an advanced accelerated-life test device, a temperature was set to about 125° C., a humidity was set to about 95% RH, and the test was performed for about 72 hours with a voltage of 100 V being applied to multilayer ceramic capacitor 10. During the test, the insulation resistance of multilayer ceramic capacitor 10 was measured at certain intervals until about 72 hours passed.

Results of the impact resistance test (crack check test) on the corner portion are shown in Table 1.

TABLE 1

|  | Example | Comparative Example 1 | Comparative Example 2 |
|---|---|---|---|
| Number of Generated Cracks | 0/20 | 10/20 | 9/20 |

Results of the moisture resistance load test are shown in Table 2.

TABLE 2

|  | Example | Comparative Example 1 | Comparative Example 2 |
|---|---|---|---|
| Number of Samples Failed in Moisture Resistance Load Test | 0/20 | 5/20 | 0/20 |

Test Results

First, in multilayer ceramic capacitor 10 according to the Example, as a result of the impact resistance test on the corner portion, no crack was generated in the polished cross section. In multilayer ceramic capacitor 10 according to the Example, the grain sizes in the dielectric layer located along each of the respective ridgeline portion sides on which the first main surface of the multilayer body at the first main surface side outer layer portion crosses the first end surface and the second end surface and each of the respective ridgeline portion sides on which the second main surface of the multilayer body at the second main surface side outer layer portion crosses the first end surface and the second end surface are adjusted to be smaller than those in the dielectric layer located on the first main surface side of the first main surface side outer layer portion and the dielectric layer located on the second main surface side of the second main surface side outer layer portion. Therefore, the number of grain boundaries in the dielectric layer located along each of the respective ridgeline portion sides on which the first main surface of the multilayer body at the first main surface side outer layer portion crosses the first end surface and the second end surface becomes large. Accordingly, a dislocation responsible for plastic deformation is reduced or prevented also at the ridgeline portion, thus resulting in increased strength against progress of crack. Accordingly, even when the multilayer ceramic capacitor is a large-size multilayer ceramic capacitor that has an increased weight and that receives a large impact on a corner portion, the strength is increased against the progress of the crack in the dielectric layer located along the ridgeline portion side.

Hence, it was suggested that an impact resistance at the corner portion of the multilayer ceramic capacitor was improved.

On the other hand, in the multilayer ceramic capacitor of Comparative Example 1, ten cracks were generated in the polished cross section. In the multilayer ceramic capacitor of Comparative Example 1, the grain sizes in the dielectric layer at any locations of the first main surface side outer layer portion and the grain sizes in the dielectric layer at any locations of the second main surface side outer layer portion were the same, thus failing to obtain an impact resistance at the corner portion.

Meanwhile, in the multilayer ceramic capacitor of Comparative Example 2, nine cracks were generated in the polished cross section. Since the multilayer ceramic capacitor of Comparative Example 2 includes a multilayer body having a two-layer structure in which grain sizes in a dielectric layer located on the inner layer portion side are smaller than grain sizes on each of the main surface sides and side surface sides, the grain sizes at each of the respective ridgeline portions at which the first main surface of the multilayer body at the first main surface side outer layer portion crosses the first end surface and the second end surface are larger than the grain sizes in the dielectric layer located on the inner layer portion side, with the result that the number of grain boundaries in the dielectric layer located along each of the respective ridgeline portion sides on which the first main surface of the multilayer body at the first main surface side outer layer portion crosses the first end surface and the second end surface becomes small. This leads to a low strength against progress of crack, thus failing to obtain an impact resistance at the corner portion.

Moreover, as a result of the moisture resistance load test, in the case of the multilayer ceramic capacitor of the Example, no sample regarded as "failed" was obtained. In multilayer ceramic capacitor 10 of the Example, at the first main surface side outer layer portion, the grain sizes in the dielectric layer located on the first main surface side of the first main surface side outer layer portion are adjusted to be larger than the grain sizes in the dielectric layer located on the inner layer portion side of the first main surface side outer layer portion, whereas at the second main surface side outer layer portion, the grain sizes in the dielectric layer located on the second main surface side of the second main surface side outer layer portion are adjusted to be larger than the grain sizes in the dielectric layer located on the inner layer portion side of the second main surface side outer layer portion. Accordingly, the number of grain boundaries between the grains in the dielectric layer located on each of the main surface sides can be reduced, with the result that it is considered that adhesion force between the multilayer body and the outer electrode is improved. As a result, it was suggested that moisture can be reduced or prevented from entering from an interface between the outer electrode and the multilayer body.

On the other hand, in the case of the multilayer ceramic capacitor of Comparative Example 1, as a result of the moisture resistance load test, five samples determined as "failed" were obtained. This is presumably due to the following reason. That is, in the multilayer ceramic capacitor of Comparative Example 1, the grain sizes in the dielectric layer at any locations of the first main surface side outer layer portion and the second main surface side outer layer portion are adjusted to be small such as about more than or equal to about 0.1 μm and less than or equal to about 0.5 μm. The number of grain boundaries between the grains in the dielectric layer located at each of the outer layer portions are comparatively large to result in decreased adhesion force between the multilayer body and the outer electrode. As a result, moisture enters from the interface between the outer electrode and the multilayer body.

Meanwhile, in the case of the multilayer ceramic capacitor of Comparative Example 2, no sample regarded as "failed" was obtained. This is presumably due to the following reason. That is, the multilayer body has a two-layer structure in which the grain sizes in the dielectric layer located on the inner layer portion side are smaller than the grain sizes on each of the main surface sides and side surface sides. Thus, as with Example 1, the number of grain boundaries between the grains can be reduced, with the result that it is considered that adhesion force between the multilayer body and the outer electrode is improved. As a result, moisture is reduced or prevented from entering from the interface between the outer electrode and the multilayer body.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer body including a plurality of laminated dielectric layers and a plurality of inner electrode layers laminated on the plurality of dielectric layers, the multilayer body including a first main surface and a second main surface opposite to each other in a lamination direction, a first end surface and a second end surface opposite to each other in a length direction orthogonal or substantially orthogonal to the lamination direction, and a first side surface and a second side surface opposite to each other in a width direction orthogonal to or substantially orthogonal to the lamination direction and the length direction;
   a first outer electrode disposed on the first end surface; and
   a second outer electrode disposed on the second end surface; wherein
   the multilayer body includes:
      an inner layer portion in which the plurality of inner electrode layers face each other;
      a first outer layer portion located on the first main surface side, the first outer layer portion including the plurality of dielectric layers located between the first main surface and each of a first outermost surface of the inner layer portion on the first main surface side and an extension line of the first outermost surface;
      a second outer layer portion located on the second main surface side, the second outer layer portion including the plurality of dielectric layers located between the second main surface and each of a second outermost surface of the inner layer portion on the second main surface side and an extension line of the second outermost surface;
      a third outer layer portion located on the first side surface side, the third outer layer portion including the plurality of dielectric layers located between the first side surface and a third outermost surface of the inner layer portion on the first side surface side; and
      a fourth outer layer portion located on the second side surface side, the fourth outer layer portion including the plurality of dielectric layers located between the second side surface and a fourth outermost surface of the inner layer portion on the second side surface side;
   at the first outer layer portion, a grain size in a dielectric layer of the plurality of dielectric layers located on the inner layer portion side is smaller than a grain size in a dielectric layer of the plurality of dielectric layers located on the first main surface side, and a grain size in a dielectric layer of the plurality of dielectric layers located along each of respective ridgeline portion sides on which the first main surface of the multilayer body crosses the first end surface and the second end surface is smaller than the grain size in a dielectric layer of the plurality of dielectric layers located on the first main surface side; and
   at the second outer layer portion, a grain size in a dielectric layer of the plurality of dielectric layers located on the inner layer portion side is smaller than a grain size in a dielectric layer of the plurality of dielectric layers located on the second main surface side, and a grain size in a dielectric layer of the plurality of dielectric layers located along each of respective ridgeline portion sides on which the second main surface of the multilayer body crosses the first end surface and the second end surface is smaller than the grain size in a dielectric layer of the plurality of dielectric layers located on the second main surface side.

2. The multilayer ceramic electronic component according to claim 1, wherein
   at the third outer layer portion, a grain size in a dielectric layer of the plurality of dielectric layers located on the inner layer portion side is smaller than a grain size in a dielectric layer of the plurality of dielectric layers located on the first side surface side; and
   at the fourth outer layer portion, a grain size in a dielectric layer of the plurality of dielectric layers located on the inner layer portion side is smaller than a grain size in a dielectric layer of the plurality of dielectric layers located on the second side surface side.

3. The multilayer ceramic electronic component according to claim 2, wherein
   at the third outer layer portion, the grain size in the dielectric layer of the plurality of dielectric layers located on the inner layer portion side is more than or equal to about 0.1 μm and less than or equal to about 0.5 μm, and the grain size in the dielectric layer of the plurality of dielectric layers located on the first side surface side is more than or equal to about 0.5 and less than or equal to about 5.0 μm; and
   at the fourth outer layer portion, the grain size in the dielectric layer of the plurality of dielectric layers located on the inner layer portion side is more than or equal to about 0.1 μm and less than or equal to about 0.5 μm, and the grain size in the dielectric layer of the plurality of dielectric layers located on the second side surface side is more than or equal to about 0.5 and less than or equal to about 5.0 μm.

4. The multilayer ceramic electronic component according to claim 1, wherein
   at the first outer layer portion, a metal of each of the plurality of inner electrode layers is diffused;
   at the first outer layer portion, an amount of diffusion of the metal in the dielectric layer located on the inner layer portion side is smaller than an amount of diffusion of the metal in the dielectric layer located on the first main surface side, and an amount of diffusion of the metal in the dielectric layer located along each of the respective ridgeline portion sides on which the first main surface of the multilayer body crosses the first end surface and the second end surface is smaller than the amount of diffusion of the metal in the dielectric layer located on the first main surface side;

at the second outer layer portion, the metal of the plurality inner electrode layers is diffused; and at the second outer layer portion, the amount of diffusion of the metal in the dielectric layer located on the inner layer portion side is smaller than an amount of diffusion of the metal in the dielectric layer located on the second main surface side of the second outer layer portion, and an amount of diffusion of the metal in the dielectric layer located along each of the respective ridgeline portion sides on which the second main surface of the multilayer body crosses the first end surface and the second end surface is smaller than the amount of diffusion of the metal in the dielectric layer located on the second main surface side of the second outer layer portion.

5. The multilayer ceramic electronic component according to claim 1, wherein at the third outer layer portion, a metal of the plurality of inner electrode layers is diffused;

at the third outer layer portion, an amount of diffusion of the metal in the dielectric layer located on the inner layer portion side is smaller than an amount of diffusion of the metal in the dielectric layer located on the first main surface side of the third outer layer portion, and an amount of diffusion of the metal in the dielectric layer located along each of the respective ridgeline portion sides on which the first side surface of the multilayer body crosses the first end surface and the second end surface is smaller than the amount of diffusion of the metal in the dielectric layer located on the first side surface side;

the fourth outer layer portion, the metal of the plurality of inner electrode layers is diffused; and at the fourth outer layer portion, an amount of diffusion of the metal in the dielectric layer located on the inner layer portion side is smaller than an amount of diffusion of the metal in the dielectric layer located on the second side surface side, and an amount of diffusion of the metal in the dielectric layer located along each of the respective ridgeline portion sides on which the second side surface of the multilayer body crosses the first end surface and the second end surface is smaller than the amount of diffusion of the metal in the dielectric layer located on the second side surface side of the fourth outer layer portion.

6. The multilayer ceramic electronic component according to claim 1, wherein each of the plurality of inner electrode layers includes Ni.

7. The multilayer ceramic electronic component according to claim 1, wherein the dielectric layer located on the inner layer portion side at the first outer layer portion includes a region that has the smaller grain size and that falls within a range of more than or equal to about 40% and less than or equal to about 60% of a distance in the lamination direction between the first main surface and the inner layer portion in contact with the first outer layer portion; and the dielectric layer located on the inner layer portion side at the second outer layer portion includes a region that has the smaller grain size and that falls within a range of more than or equal to about 40% and less than or equal to about 60% of a distance in the lamination direction between the second main surface and the inner layer portion in contact with the second outer layer portion.

8. The multilayer ceramic electronic component according to claim 1, wherein the dielectric layer located along the ridgeline portion side of the multilayer body includes a region that has the smaller grain size and that extends to a location of about ½ of a distance of an underlying electrode layer from the first end surface toward the second end surface in the length direction, the underlying electrode layer being disposed on the first main surface or the second main surface; and the region that has the smaller grain size and that is included in the dielectric layer located along the ridgeline portion side of the multilayer body has a thickness along the ridgeline portion side of the multilayer body, the thickness being more than or equal to about 30% of a distance in the lamination direction between the first main surface and the inner layer portion in contact with the first outer layer portion or a distance in the lamination direction between the second main surface and the inner layer portion in contact with the second outer layer portion.

9. The multilayer ceramic electronic component according to claim 1, wherein the dielectric layer located on the inner layer portion side at the third outer layer portion includes a region that has the smaller grain size and that falls within a range of more than or equal to about 40% and less than or equal to about 60% of a distance in the width direction between the first side surface at the third outer layer portion and the inner layer portion in contact with the third outer layer portion; and the dielectric layer located on the inner layer portion side at the fourth outer layer portion includes a region that has the smaller grain size and that falls within a range of more than or equal to about 40% and less than or equal to about 60% of a distance in the width direction between the second side surface at the fourth outer layer portion and the inner layer portion in contact with the fourth outer layer portion.

10. The multilayer ceramic electronic component according to claim 1, wherein the multilayer body has a rectangular or substantially rectangular parallelepiped shape.

11. The multilayer ceramic electronic component according to claim 1, wherein the multilayer body includes rounded corner portions and rounded ridgeline portions.

12. The multilayer ceramic electronic component according to claim 1, wherein at the first outer layer portion, the grain size in the dielectric layer of the plurality of dielectric layers located on the inner layer portion side is more than or equal to about 0.1 μm and less than or equal to about 0.5 μm, and the grain size in the dielectric layer of the plurality of dielectric layers located on the first main surface side is more than or equal to about 0.5 and less than or equal to about 5.0 μm; and at the second outer layer portion, the grain size in the dielectric layer of the plurality of dielectric layers located on the inner layer portion side is more than or equal to about 0.1 μm and less than or equal to about 0.5 μm, and the grain size in the dielectric layer of the plurality of dielectric layers located on the second main surface side is more than or equal to about 0.5 and less than or equal to about 5.0 μm.

13. The multilayer ceramic electronic component according to claim 1, wherein each of the first and second outer electrodes includes an underlying electrode layer and a plating layer disposed on the underlying layer.

14. The multilayer ceramic electronic component according to claim 13, wherein the underlying layer is a baked layer.

15. The multilayer ceramic electronic component according to claim 14, wherein the baked layer includes glass and a metal.

16. The multilayer ceramic electronic component according to claim 15, wherein the metal includes at least one of Cu, Ni, Ag, Pd, an Ag—Pd alloy, and Au.

17. The multilayer ceramic electronic component according to claim 15, wherein the glass includes at least one of B, Si, Ba, Mg, Al, and Li.

18. The multilayer ceramic electronic component according to claim 14, wherein the baked layer has a thickness more than or equal to about 10 μm and less than or equal to about 200 μm.

19. The multilayer ceramic electronic component according to claim 13, wherein the plating layer includes a first plating layer and a second plating layer.

20. The multilayer ceramic electronic component according to claim 19, wherein the first plating layer includes Ni; and
the second plating layer includes Sn.

* * * * *